(12) United States Patent
Bridges et al.

(10) Patent No.: US 9,377,885 B2
(45) Date of Patent: Jun. 28, 2016

(54) METHOD AND APPARATUS FOR LOCKING ONTO A RETROREFLECTOR WITH A LASER TRACKER

(71) Applicant: FARO Technologies, Inc., Lake Mary, FL (US)

(72) Inventors: Robert E. Bridges, Kennett Square, PA (US); Jennifer K. Park, Orlando, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/531,113

(22) Filed: Nov. 3, 2014

(65) Prior Publication Data

US 2015/0049329 A1    Feb. 19, 2015

Related U.S. Application Data

(60) Continuation-in-part of application No. 14/180,900, filed on Feb. 14, 2014, now Pat. No. 8,896,848, which is a division of application No. 13/803,479, filed on Mar. 14, 2013, now Pat. No. 8,654,355, which is a (Continued)

(51) Int. Cl.
*G01B 11/14*   (2006.01)
*G06F 3/041*   (2006.01)

(Continued)

(52) U.S. Cl.
CPC ............... *G06F 3/041* (2013.01); *G01B 5/004* (2013.01); *G01B 11/002* (2013.01); *G01B 11/14* (2013.01);

(Continued)

(58) Field of Classification Search
CPC ........................................ G01B 11/14
USPC ............................................... 356/614
See application file for complete search history.

(56) References Cited

U.S. PATENT DOCUMENTS 2,612,994 A   10/1952   Woodland
2,682,804 A    7/1954   Clifford et al.

(Continued)

FOREIGN PATENT DOCUMENTS

CA   2811444   3/2012
CN   1263807 A   8/2000

(Continued)

OTHER PUBLICATIONS

Chinese Office Action dated Nov. 2, 2014 corresponding to Chinese App. No. 201280018625.X.

(Continued)

*Primary Examiner* — Roy M Punnoose
(74) *Attorney, Agent, or Firm* — Cantor Colburn LLP

(57) ABSTRACT

A three-dimensional (3D) coordinate measurement system includes a communication device, a retroreflector, and a laser tracker. The communication device includes a first light source and an operator-controlled unit that controls emission from the first light source. The laser tracker includes a wide field-of-view (FOV) camera, a second light source, a narrow FOV camera next to the second light source, and a processor. The processor determines that a lock-in command has been given in response to the wide FOV camera capturing light emitted by the first light source. To lock onto the retroreflector, the processor captures with the narrow FOV camera light from the second light source reflected by the retroreflector and uses the image to lock onto the retroreflector with a beam of light from the tracker. It measures a distance and two angles with the tracker to get 3D coordinates of the retroreflector.

30 Claims, 27 Drawing Sheets

Related U.S. Application Data division of application No. 13/090,889, filed on Apr. 20, 2011, now Pat. No. 8,422,034.

(60) Provisional application No. 61/326,294, filed on Apr. 21, 2010.

(51) Int. Cl.

| | | |
|---|---|---|
| *G01S 17/66* | (2006.01) | |
| *G01C 15/00* | (2006.01) | |
| *G01S 17/02* | (2006.01) | |
| *G06F 3/01* | (2006.01) | |
| *G06F 3/03* | (2006.01) | |
| *H04N 5/232* | (2006.01) | |
| *G01B 21/04* | (2006.01) | |
| *G01B 5/004* | (2006.01) | |
| *G01B 11/00* | (2006.01) | |
| *G06F 3/0346* | (2013.01) | |

(52) U.S. Cl.
CPC ............ *G01B 21/047* (2013.01); *G01C 15/002* (2013.01); *G01S 17/023* (2013.01); *G01S 17/66* (2013.01); *G06F 3/017* (2013.01); *G06F 3/0304* (2013.01); *G06F 3/0346* (2013.01); *H04N 5/23296* (2013.01)

(56) References Cited

U.S. PATENT DOCUMENTS

| | | |
|---|---|---|
| 2,484,641 A | 3/1957 | Keuffel et al. |
| 2,784,641 A | 3/1957 | Keuffel et al. |
| 3,339,457 A | 9/1967 | Pun |
| 3,365,717 A | 1/1968 | Holscher |
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,178,515 A | 12/1979 | Tarasevich |
| 4,297,030 A | 10/1981 | Chaborski |
| 4,403,857 A | 9/1983 | Holscher |
| 4,413,907 A | 11/1983 | Lane |
| 4,453,825 A | 6/1984 | Buck et al. |
| 4,498,764 A | 2/1985 | Bolkow et al. |
| 4,521,107 A | 6/1985 | Chaborski et al. |
| 4,531,833 A | 7/1985 | Ohtomo |
| 4,537,475 A | 8/1985 | Summers et al. |
| 4,560,270 A | 12/1985 | Wiklund et al. |
| 4,632,547 A | 12/1986 | Kaplan et al. |
| 4,652,130 A | 3/1987 | Tank |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,731,812 A | 3/1988 | Akerberg |
| 4,731,879 A | 3/1988 | Sepp et al. |
| 4,767,257 A | 8/1988 | Kato |
| 4,777,660 A | 10/1988 | Gould et al. |
| 4,790,651 A | 12/1988 | Brown et al. |
| 4,839,507 A | 6/1989 | May |
| 4,983,021 A | 1/1991 | Fergason |
| 5,002,388 A | 3/1991 | Ohishi et al. |
| 5,051,934 A | 9/1991 | Wiklund |
| 5,069,524 A | 12/1991 | Watanabe et al. |
| 5,082,364 A | 1/1992 | Russell |
| 5,090,131 A | 2/1992 | Deer |
| 5,121,242 A | 6/1992 | Kennedy |
| 5,137,354 A | 8/1992 | Devos et al. |
| 5,138,154 A | 8/1992 | Hotelling |
| 5,162,862 A | 11/1992 | Bartram et al. |
| 5,198,868 A | 3/1993 | Saito et al. |
| 5,237,384 A | 8/1993 | Fukunaga et al. |
| 5,263,103 A | 11/1993 | Kosinski |
| 5,267,014 A | 11/1993 | Prenninger |
| 5,301,005 A | 4/1994 | DeVos et al. |
| 5,313,409 A | 5/1994 | Wiklund et al. |
| 5,319,434 A | 6/1994 | Croteau et al. |
| 5,347,306 A | 9/1994 | Nitta |
| 5,392,521 A | 2/1995 | Allen |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,440,326 A | 8/1995 | Quinn |
| 5,448,505 A | 9/1995 | Novak |
| 5,455,670 A | 10/1995 | Payne et al. |
| 5,500,737 A | 3/1996 | Donaldson et al. |
| 5,532,816 A | 7/1996 | Spann et al. |
| 5,534,992 A | 7/1996 | Takeshima et al. |
| 5,594,169 A | 1/1997 | Field et al. |
| D378,751 S | 4/1997 | Smith |
| 5,671,160 A | 9/1997 | Julian |
| 5,698,784 A | 12/1997 | Hotelling et al. |
| 5,724,264 A | 3/1998 | Rosenberg et al. |
| 5,737,068 A | 4/1998 | Kaneko et al. |
| 5,742,379 A | 4/1998 | Reifer |
| 5,754,284 A | 5/1998 | Leblanc et al. |
| RE35,816 E | 6/1998 | Schulz |
| 5,764,360 A | 6/1998 | Meier |
| 5,767,952 A | 6/1998 | Ohtomo et al. |
| 5,771,623 A | 6/1998 | Pernstich et al. |
| 5,817,243 A | 10/1998 | Shaffer |
| 5,825,350 A | 10/1998 | Case, Jr. et al. |
| 5,828,057 A | 10/1998 | Hertzman et al. |
| 5,861,956 A | 1/1999 | Bridges et al. |
| 5,880,822 A | 3/1999 | Kubo |
| 5,886,775 A | 3/1999 | Houser et al. |
| 5,886,777 A | 3/1999 | Hirunuma |
| 5,892,575 A | 4/1999 | Marino |
| 5,893,214 A | 4/1999 | Meier et al. |
| 5,898,421 A | 4/1999 | Quinn |
| 5,926,388 A | 7/1999 | Kimbrough et al. |
| 5,930,030 A | 7/1999 | Scifres |
| 5,957,559 A | 9/1999 | Rueb et al. |
| 5,973,788 A | 10/1999 | Pettersen et al. |
| 5,991,011 A | 11/1999 | Damm |
| 6,017,125 A | 1/2000 | Vann |
| 6,023,326 A | 2/2000 | Katayama et al. |
| 6,034,722 A | 3/2000 | Viney et al. |
| 6,036,319 A | 3/2000 | Rueb et al. |
| 6,052,190 A | 4/2000 | Sekowski et al. |
| D427,087 S | 6/2000 | Kaneko et al. |
| 6,085,155 A | 7/2000 | Hayase et al. |
| 6,097,491 A | 8/2000 | Hartrumpf |
| 6,097,897 A | 8/2000 | Ide |
| 6,100,540 A | 8/2000 | Ducharme et al. |
| 6,111,563 A | 8/2000 | Hines |
| 6,122,058 A | 9/2000 | Van Der Werf et al. |
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |
| 6,369,794 B1 | 4/2002 | Sakurai et al. |

(56) References Cited

U.S. PATENT DOCUMENTS

| | | | |
|---|---|---|---|
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |
| 6,463,393 B1 | 10/2002 | Giger |
| 6,490,027 B1 | 12/2002 | Rajchel et al. |
| 6,501,543 B2 | 12/2002 | Hedges et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,611,617 B1 | 8/2003 | Crampton |
| 6,624,916 B1 | 9/2003 | Green et al. |
| 6,630,993 B1 | 10/2003 | Hedges et al. |
| 6,633,367 B2 | 10/2003 | Gogolla |
| 6,646,732 B2 | 11/2003 | Ohtomo et al. |
| 6,650,222 B2 | 11/2003 | Darr |
| 6,667,798 B1 | 12/2003 | Markendorf et al. |
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,754,370 B1 | 6/2004 | Hall-Holt et al. |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,253,891 B2 | 8/2007 | Toker et al. |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,336,375 B1 | 2/2008 | Faul et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,429,112 B2 | 9/2008 | Metcalfe |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 | 11/2009 | Scherch |
| 7,614,019 B2 | 11/2009 | Rimas Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Bridges et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,894,079 B1 | 2/2011 | Altendorf et al. |
| 7,903,237 B1 | 3/2011 | Li |
| 7,929,150 B1 | 4/2011 | Schweiger |
| 7,954,250 B2 | 6/2011 | Crampton |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,125,629 B2 | 2/2012 | Dold et al. |
| 8,151,477 B2 | 4/2012 | Tait |
| 8,190,030 B2 | 5/2012 | Leclair et al. |
| 8,217,893 B2 | 7/2012 | Quinn et al. |
| 8,237,934 B1 | 8/2012 | Cooke et al. |
| 8,244,023 B2 | 8/2012 | Yamada |
| 8,314,939 B2 | 11/2012 | Kato et al. |
| 8,320,708 B2 | 11/2012 | Kurzweil et al. |
| 8,360,240 B2 | 1/2013 | Kallabis |
| 8,379,224 B1 | 2/2013 | Piasse et al. |
| 8,387,961 B2 | 3/2013 | Im |
| 8,405,604 B2 | 3/2013 | Pryor et al. |
| 8,422,034 B2 * | 4/2013 | Steffensen ........... G01C 15/002 356/614 |
| 8,437,011 B2 * | 5/2013 | Steffensen ........... G01C 15/002 356/614 |
| 8,438,747 B2 | 5/2013 | Ferrari et al. |

(56) References Cited

U.S. PATENT DOCUMENTS

| | | |
|---|---|---|
| 8,467,071 B2 | 6/2013 | Steffey et al. |
| 8,467,072 B2 * | 6/2013 | Cramer .................. G01B 11/03 356/614 |
| 8,483,512 B2 | 7/2013 | Moeller |
| 8,509,949 B2 | 8/2013 | Bordyn et al. |
| 8,525,983 B2 | 9/2013 | Bridges et al. |
| 8,537,371 B2 | 9/2013 | Steffensen et al. |
| 8,537,375 B2 * | 9/2013 | Steffensen ........... G01C 15/002 356/614 |
| 8,553,212 B2 | 10/2013 | Jaeger et al. |
| 8,593,648 B2 | 11/2013 | Cramer et al. |
| 8,619,265 B2 | 12/2013 | Steffey et al. |
| 8,630,314 B2 | 1/2014 | York |
| 8,638,984 B2 | 1/2014 | Roithmeier |
| 8,654,354 B2 * | 2/2014 | Steffensen ........... G01C 15/002 356/614 |
| 8,659,749 B2 | 2/2014 | Bridges |
| 8,670,114 B2 | 3/2014 | Bridges et al. |
| 8,681,317 B2 | 3/2014 | Moser et al. |
| 8,699,756 B2 | 4/2014 | Jensen et al. |
| 8,717,545 B2 | 5/2014 | Sebastian et al. |
| 8,740,396 B2 | 6/2014 | Brown et al. |
| 8,772,719 B2 | 7/2014 | Böckem |
| 8,773,667 B2 | 7/2014 | Edmonds et al. |
| 8,848,203 B2 | 9/2014 | Bridges et al. |
| 8,874,406 B2 | 10/2014 | Rotvold et al. |
| 8,902,408 B2 | 12/2014 | Bridges |
| 8,931,183 B2 | 1/2015 | Jonas |
| 9,151,830 B2 | 10/2015 | Bridges |
| 2001/0045534 A1 | 11/2001 | Kimura |
| 2002/0033940 A1 | 3/2002 | Hedges et al. |
| 2002/0093646 A1 | 7/2002 | Muraoka |
| 2002/0148133 A1 | 10/2002 | Bridges et al. |
| 2002/0179866 A1 | 12/2002 | Hoeller et al. |
| 2003/0014212 A1 | 1/2003 | Ralston et al. |
| 2003/0020895 A1 | 1/2003 | Bridges |
| 2003/0033041 A1 | 2/2003 | Richey |
| 2003/0035195 A1 | 2/2003 | Blech et al. |
| 2003/0048459 A1 | 3/2003 | Gooch |
| 2003/0066202 A1 | 4/2003 | Eaton |
| 2003/0090682 A1 | 5/2003 | Gooch et al. |
| 2003/0112449 A1 | 6/2003 | Tu et al. |
| 2003/0125901 A1 | 7/2003 | Steffey et al. |
| 2003/0133092 A1 | 7/2003 | Rogers |
| 2003/0179362 A1 | 9/2003 | Osawa et al. |
| 2003/0206285 A1 | 11/2003 | Lau |
| 2004/0035277 A1 | 2/2004 | Hubbs |
| 2004/0041996 A1 | 3/2004 | Abe |
| 2004/0075823 A1 | 4/2004 | Lewis et al. |
| 2004/0100705 A1 | 5/2004 | Hubbs |
| 2004/0170363 A1 | 9/2004 | Angela |
| 2004/0189944 A1 | 9/2004 | Kaufman et al. |
| 2004/0218104 A1 | 11/2004 | Smith et al. |
| 2004/0223139 A1 | 11/2004 | Vogel |
| 2005/0058179 A1 | 3/2005 | Phipps |
| 2005/0147477 A1 | 7/2005 | Clark |
| 2005/0179890 A1 | 8/2005 | Cramer et al. |
| 2005/0185182 A1 | 8/2005 | Raab et al. |
| 2005/0197145 A1 | 9/2005 | Chae et al. |
| 2005/0254043 A1 | 11/2005 | Chiba |
| 2005/0284937 A1 | 12/2005 | Xi et al. |
| 2006/0009929 A1 | 1/2006 | Boyette, Jr. et al. |
| 2006/0053647 A1 | 3/2006 | Raab et al. |
| 2006/0055662 A1 | 3/2006 | Rimas-Ribikauskas et al. |
| 2006/0055685 A1 | 3/2006 | Rimas-Ribikauskas et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0140473 A1 | 6/2006 | Brooksby et al. |
| 2006/0141435 A1 | 6/2006 | Chiang |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0222237 A1 | 10/2006 | Du et al. |
| 2006/0222314 A1 | 10/2006 | Zumbrunn et al. |
| 2006/0235611 A1 | 10/2006 | Deaton et al. |
| 2006/0262001 A1 | 11/2006 | Ouchi et al. |
| 2006/0279246 A1 | 12/2006 | Hashimoto et al. |
| 2007/0016386 A1 | 1/2007 | Husted |
| 2007/0019212 A1 | 1/2007 | Gatsios et al. |
| 2007/0024842 A1 | 2/2007 | Nishizawa et al. |
| 2007/0090309 A1 | 4/2007 | Hu et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0236452 A1 | 10/2007 | Venkatesh et al. |
| 2007/0247615 A1 | 10/2007 | Bridges et al. |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0107305 A1 | 5/2008 | Vanderkooy et al. |
| 2008/0122786 A1 | 5/2008 | Pryor et al. |
| 2008/0203299 A1 | 8/2008 | Kozuma et al. |
| 2008/0229592 A1 | 9/2008 | Hinderling et al. |
| 2008/0239281 A1 | 10/2008 | Bridges |
| 2008/0246974 A1 | 10/2008 | Wilson et al. |
| 2008/0250659 A1 | 10/2008 | Bellerose et al. |
| 2008/0297808 A1 | 12/2008 | Riza et al. |
| 2008/0302200 A1 | 12/2008 | Tobey |
| 2008/0309949 A1 | 12/2008 | Rueb |
| 2008/0316497 A1 | 12/2008 | Taketomi et al. |
| 2008/0316503 A1 | 12/2008 | Smarsh et al. |
| 2009/0000136 A1 | 1/2009 | Crampton |
| 2009/0009747 A1 | 1/2009 | Wolf et al. |
| 2009/0033621 A1 | 2/2009 | Quinn et al. |
| 2009/0046271 A1 | 2/2009 | Constantikes |
| 2009/0066932 A1 | 3/2009 | Bridges et al. |
| 2009/0109426 A1 | 4/2009 | Cramer et al. |
| 2009/0153817 A1 | 6/2009 | Kawakubo |
| 2009/0157226 A1 | 6/2009 | De Smet |
| 2009/0171618 A1 | 7/2009 | Kumagai et al. |
| 2009/0187373 A1 | 7/2009 | Atwell et al. |
| 2009/0190125 A1 | 7/2009 | Foster et al. |
| 2009/0205088 A1 | 8/2009 | Crampton et al. |
| 2009/0213073 A1 | 8/2009 | Obermeyer et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2009/0244277 A1 | 10/2009 | Nagashima et al. |
| 2010/0008543 A1 | 1/2010 | Yamada et al. |
| 2010/0025746 A1 | 2/2010 | Chapman et al. |
| 2010/0058252 A1 | 3/2010 | Ko |
| 2010/0091112 A1 | 4/2010 | Veeser et al. |
| 2010/0103431 A1 | 4/2010 | Demopoulos |
| 2010/0128259 A1 | 5/2010 | Bridges et al. |
| 2010/0142798 A1 | 6/2010 | Weston et al. |
| 2010/0149518 A1 | 6/2010 | Nordenfelt et al. |
| 2010/0149525 A1 | 6/2010 | Lau |
| 2010/0158361 A1 | 6/2010 | Grafinger et al. |
| 2010/0176270 A1 | 7/2010 | Lau et al. |
| 2010/0207938 A1 | 8/2010 | Yau et al. |
| 2010/0225746 A1 | 9/2010 | Shpunt et al. |
| 2010/0234094 A1 | 9/2010 | Gagner et al. |
| 2010/0235786 A1 | 9/2010 | Maizels et al. |
| 2010/0245851 A1 | 9/2010 | Teodorescu |
| 2010/0250175 A1 | 9/2010 | Briggs et al. |
| 2010/0250188 A1 | 9/2010 | Brown |
| 2010/0251148 A1 | 9/2010 | Brown |
| 2010/0265316 A1 | 10/2010 | Sali et al. |
| 2010/0277747 A1 | 11/2010 | Rueb et al. |
| 2010/0284082 A1 | 11/2010 | Shpunt et al. |
| 2011/0001958 A1 | 1/2011 | Bridges et al. |
| 2011/0003507 A1 | 1/2011 | Van Swearingen et al. |
| 2011/0007154 A1 | 1/2011 | Vogel et al. |
| 2011/0023578 A1 | 2/2011 | Grasser |
| 2011/0025827 A1 | 2/2011 | Shpunt et al. |
| 2011/0032509 A1 | 2/2011 | Bridges et al. |
| 2011/0035952 A1 | 2/2011 | Roithmeier |
| 2011/0043620 A1 | 2/2011 | Svanholm et al. |

(56) References Cited

U.S. PATENT DOCUMENTS

| | | |
|---|---|---|
| 2011/0043808 A1 | 2/2011 | Isozaki et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0109502 A1 | 5/2011 | Sullivan |
| 2011/0112786 A1 | 5/2011 | Desforges et al. |
| 2011/0123097 A1 | 5/2011 | Van Coppenolle et al. |
| 2011/0128625 A1 | 6/2011 | Larsen et al. |
| 2011/0166824 A1 | 7/2011 | Haisty et al. |
| 2011/0169924 A1 | 7/2011 | Haisty et al. |
| 2011/0170534 A1 | 7/2011 | York |
| 2011/0173827 A1 | 7/2011 | Bailey et al. |
| 2011/0175745 A1 | 7/2011 | Atwell et al. |
| 2011/0176145 A1 | 7/2011 | Edmonds et al. |
| 2011/0179281 A1 | 7/2011 | Chevallier-Mames et al. |
| 2011/0181872 A1 | 7/2011 | Dold et al. |
| 2011/0260033 A1* | 10/2011 | Steffensen ............ G01C 15/002 250/203.1 |
| 2011/0301902 A1 | 12/2011 | Panagas et al. |
| 2012/0050255 A1 | 3/2012 | Thomas et al. |
| 2012/0062706 A1 | 3/2012 | Keshavmurthy et al. |
| 2012/0065928 A1 | 3/2012 | Rotvold et al. |
| 2012/0099117 A1 | 4/2012 | Hanchett et al. |
| 2012/0105821 A1 | 5/2012 | Moser et al. |
| 2012/0120391 A1 | 5/2012 | Dold et al. |
| 2012/0120415 A1 | 5/2012 | Steffensen et al. |
| 2012/0124850 A1 | 5/2012 | Ortleb et al. |
| 2012/0154577 A1 | 6/2012 | Yoshikawa et al. |
| 2012/0188559 A1 | 7/2012 | Becker et al. |
| 2012/0206716 A1 | 8/2012 | Cramer et al. |
| 2012/0206808 A1 | 8/2012 | Brown et al. |
| 2012/0218563 A1 | 8/2012 | Spruck et al. |
| 2012/0236320 A1 | 9/2012 | Steffey et al. |
| 2012/0262550 A1 | 10/2012 | Bridges |
| 2012/0262573 A1 | 10/2012 | Bridges et al. |
| 2012/0262728 A1 | 10/2012 | Bridges et al. |
| 2012/0265479 A1 | 10/2012 | Bridges et al. |
| 2012/0317826 A1 | 12/2012 | Jonas |
| 2013/0037694 A1* | 2/2013 | Steffensen ............ G01C 15/002 250/203.2 |
| 2013/0096873 A1 | 4/2013 | Rosengaus et al. |
| 2013/0100282 A1 | 4/2013 | Siercks et al. |
| 2013/0128284 A1 | 5/2013 | Steffey et al. |
| 2013/0155386 A1 | 6/2013 | Bridges et al. |
| 2013/0162469 A1 | 6/2013 | Zogg et al. |
| 2013/0201470 A1 | 8/2013 | Cramer et al. |
| 2013/0293684 A1 | 11/2013 | Becker et al. |
| 2014/0002806 A1 | 1/2014 | Buchel et al. |
| 2014/0028805 A1 | 1/2014 | Tohme et al. |
| 2014/0320643 A1 | 10/2014 | Markendorf |

FOREIGN PATENT DOCUMENTS

| | | |
|---|---|---|
| CN | 1290850 A | 4/2001 |
| CN | 1362692 A | 8/2002 |
| CN | 1474159 A | 2/2004 |
| CN | 1531659 A | 9/2004 |
| CN | 1608212 A | 4/2005 |
| CN | 1926400 A | 3/2007 |
| CN | 101031817 A | 9/2007 |
| CN | 101203730 A | 6/2008 |
| CN | 101297176 A | 10/2008 |
| CN | 101371160 A | 2/2009 |
| CN | 101427155 A | 5/2009 |
| CN | 101776982 A | 7/2010 |
| CN | 201548192 U | 8/2010 |
| DE | 7704949 U1 | 6/1977 |
| DE | 3530922 A1 | 8/1984 |
| DE | 3827458 A1 | 2/1990 |
| DE | 10160090 A1 | 7/2002 |
| DE | 102004024171 A1 | 9/2005 |
| DE | 102005019058 A1 | 12/2005 |
| DE | 102006013185 A1 | 9/2007 |
| DE | 202006020299 U1 | 5/2008 |
| DE | 60319016 | 4/2009 |
| DE | 102007058692 A1 | 6/2009 |
| DE | 102009040837 A1 | 3/2011 |
| EP | 0166106 | 1/1986 |
| EP | 0598523 A1 | 5/1994 |
| EP | 598523 A1 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |
| EP | 1519141 | 3/2005 |
| EP | 1607767 A1 | 12/2005 |
| EP | 2136178 A1 | 12/2009 |
| EP | 2177868 A2 | 4/2010 |
| EP | 2219011 A1 | 8/2010 |
| EP | 2259010 A1 | 12/2010 |
| EP | 2259013 A1 | 12/2010 |
| EP | 2322901 A2 | 5/2011 |
| EP | 2446300 A1 | 5/2012 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | S57147800 | 9/1982 |
| JP | S5804881 | 1/1983 |
| JP | S5848881 A | 3/1983 |
| JP | 2184788 A1 | 7/1990 |
| JP | H02184788 | 7/1990 |
| JP | H0331715 A | 2/1991 |
| JP | H0371116 A | 3/1991 |
| JP | H0465631 A | 3/1992 |
| JP | H05257005 | 10/1993 |
| JP | H6097288 | 4/1994 |
| JP | H06214186 A | 8/1994 |
| JP | H06229715 A | 8/1994 |
| JP | H0665818 | 9/1994 |
| JP | H06265355 A | 9/1994 |
| JP | H074967 A | 1/1995 |
| JP | H08145679 A | 6/1996 |
| JP | H0914965 A | 1/1997 |
| JP | H09113223 A | 5/1997 |
| JP | H102722 A | 1/1998 |
| JP | H10107357 A | 4/1998 |
| JP | H10317874 A | 12/1998 |
| JP | 11502629 A | 3/1999 |
| JP | H11304465 A | 11/1999 |
| JP | H11513495 A | 11/1999 |
| JP | H11337642 | 12/1999 |
| JP | 2000503476 A | 3/2000 |
| JP | 2000275042 | 10/2000 |
| JP | 2000346645 A | 12/2000 |
| JP | 2001013247 A | 1/2001 |
| JP | 2001165662 A | 6/2001 |
| JP | 2001513204 A | 8/2001 |
| JP | 2001272468 | 10/2001 |
| JP | 2001284317 A | 10/2001 |
| JP | 2001353112 A | 12/2001 |
| JP | 2002089184 A | 3/2002 |
| JP | 2002098762 | 4/2002 |
| JP | 2002209361 A | 7/2002 |
| JP | 2003506691 A | 2/2003 |
| JP | 2004508954 A | 3/2004 |
| JP | 2004508954 A | 3/2004 |
| JP | 2004108939 | 4/2004 |
| JP | 2004527751 | 9/2004 |
| JP | 3109969 U | 6/2005 |
| JP | 2005265700 A | 9/2005 |
| JP | 2005265700 A | 9/2005 |
| JP | 2006003127 A | 1/2006 |
| JP | 2006084460 A | 3/2006 |
| JP | 2006220514 A | 8/2006 |
| JP | 2006276012 A | 10/2006 |
| JP | 2006526844 A | 11/2006 |
| JP | 2007504459 A | 3/2007 |

(56) References Cited

FOREIGN PATENT DOCUMENTS

| | | | |
|---|---|---|---|
| JP | 2007165331 A | 6/2007 |
| JP | 2007523357 A | 8/2007 |
| JP | 2007256872 A | 10/2007 |
| JP | 2008027308 A | 2/2008 |
| JP | 2008514967 | 5/2008 |
| JP | 2008544215 A | 12/2008 |
| JP | 2009014639 A | 1/2009 |
| JP | 2009134761 A | 6/2009 |
| JP | 2009229350 A | 10/2009 |
| JP | 2011158371 A | 8/2011 |
| JP | 2011526706 A | 10/2011 |
| JP | 2013525787 A | 10/2011 |
| JP | H04504468 A | 10/2011 |
| JP | 2012509464 A | 4/2012 |
| JP | 2012530909 A | 12/2012 |
| JP | 5302976 B2 | 10/2013 |
| TW | 381361 B | 2/2000 |
| WO | 9012284 | 10/1990 |
| WO | 9534849 A1 | 12/1995 |
| WO | 0109642 A1 | 2/2001 |
| WO | 0177613 A1 | 10/2001 |
| WO | 0223121 A1 | 3/2002 |
| WO | 0237466 A1 | 5/2002 |
| WO | 02084327 A2 | 10/2002 |
| WO | 03062744 A1 | 7/2003 |
| WO | 03073121 A1 | 9/2003 |
| WO | 2004063668 | 7/2004 |
| WO | 2005026772 A2 | 3/2005 |
| WO | 2006039682 A1 | 4/2006 |
| WO | 2006052259 A1 | 5/2006 |
| WO | 2006055770 A2 | 5/2006 |
| WO | 2006133799 A1 | 12/2006 |
| WO | 2007079601 A1 | 7/2007 |
| WO | 2007084209 | 7/2007 |
| WO | 2007123604 A1 | 11/2007 |
| WO | 2007124010 A2 | 11/2007 |
| WO | 2008052348 A1 | 5/2008 |
| WO | 2008119073 A2 | 10/2008 |
| WO | 2008121919 A1 | 10/2008 |
| WO | 2010057169 A2 | 5/2010 |
| WO | 2010100043 A1 | 9/2010 |
| WO | 2010107434 A1 | 9/2010 |
| WO | 2010141120 A2 | 12/2010 |
| WO | 2010148525 A1 | 12/2010 |
| WO | 2010148526 A1 | 12/2012 |
| WO | 2011035290 | 3/2011 |
| WO | 2011057130 A2 | 5/2011 |
| WO | 2011107729 A1 | 9/2011 |
| WO | 2011112277 A1 | 9/2011 |
| WO | 2014143644 A1 | 9/2014 |
| WO | 2014149701 A1 | 9/2014 |
| WO | 2014149704 A1 | 9/2014 |
| WO | 2014149705 A1 | 9/2014 |
| WO | 2014149706 A1 | 9/2014 |
| WO | 2014149702 A1 | 9/2015 |

OTHER PUBLICATIONS

DE Office Action dated Dec. 4, 2014 corresponding to German App. No. 11 2012 001 254.2.
GB OA dated Nov. 20, 2014 corresponding to GB App. No. GB1407388.6.
GB Office Action dated Nov. 20, 2014 corresponding to GB App. No. 1407389.4.
International Search Report and Written Opinion for Application No. PCT/US2012/070283 dated Mar. 27, 2013.
Japanese Office Action dated Nov. 11, 2014 corresponding to Japanese Patent App. 2014-505328.
Katowski "Optical 3-D Measurement Techniques—Applications in inspection, quality control and robotic" Vienna, Austria, Sep. 18-20, 1989.
Leica Absolute Tracker AT401 Powerlock, Dec. 18, 2014.
Non Final Office Action for U.S. Appl. No. 13/832,658, mailed on Oct. 2, 2014, 92 pages.
Non-Final Office Action dated Jan. 5, 2015.
Notice of Allowance dated Jan. 5, 2015.
Notice of Allowance for U.S. Appl. No. 14/199,211 mailed Aug. 21, 2014, pp. 1-42.
Notice of Allowance, Issued Oct. 21, 2014 for U.S. Appl. No. 13/443,946.
OA, issued Nov. 25, 2014, Japanese Patent Application No. 2013-553585, Based on PCT Application No. PCT/US2012/024629 filed Feb. 10, 2012.
Office Action Dated Aug. 15, 2014, for Application No. GB1412305.3.
Office Action Mailed Oct. 20, 2014.
Office Action Mailed Oct. 28, 2014.
Office Action Mailed Oct. 29, 2014.
Office Action Mailed Aug. 12, 2014.
Office Action Mailed Aug. 26, 2014.
Office Action Mailed Sep. 22, 2014.
Office Action, Issued Oct. 10, 2014.
Office Action, Issued Nov. 3, 2014.
Office Action, Issued Nov. 12, 2014.
Office Action, Mailed Aug. 26, 2014.
Office Action, Mailed Oct. 13, 2014.
PCT IPRP mailed Aug. 14, 2014 for PCT/US2012/034611.
Written Opinion of the International Searching Authority mailed Jun. 29, 2012 for International Application Serial No. PCT/US2012/027083; International filing date Feb. 29, 2012.
International Search Report and Written Opinion for Application No. PCT/US2012/032971 dated Sep. 3, 2012.
"A New Generation of Total Stations from Leica Geosystems." K. Zeiske. Leica Geosystems AG, May 1999, 8 pages.
"Fiber Optic Rotary Joints Product Guide"; Moog Inc; MS1071, rev. 2; p. 1-4; 2010; Retrieved on Nov. 13, 2013 from http://www.moog.com/literature/ICD/Moog-Fiber-Optic-Rotary-Joint_Catalog-en.pdf.
"Technical Brief: Fiber Optic Rotary Joint"; Document No. 303; Moog Inc; p. 1-6; 2008; Retreived on Nov. 13, 2013 from http://www.moog.com/literature/MCG/FORJtechbrief.pdf.
2x2 High Speed Lithium Niobate Interferometric Switch; [on-line]; JDS Uniphase Corporation; 2007; Retreived from www.jdsu.com.
AO Modulator—M040-8J-FxS; [online—technical data sheet]; Gooch & Housego; Nov. 2006; Retrieved from http://www.goochandhousego.com/.
Automated Precision, Inc., Product Specifications, Radian, Featuring INNOVO Technology, info@apisensor.com, Copyright 2011.
Cao, et al.; "VisionWand: Interaction Techniques for Large Displays using a Passive Wand Tracked in 3D"; Proceedings of the 16th Annual ACM Symposium on User Interface Software and Technology, UIST; vol. 5, issue 2; pp. 173-182; Jan. 2003.
Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131.
Chinese Office Action issued Sep. 22, 2013 for Patent Application No. 201010251189.3.
Chinese Search Report for Chinese Patent Application No. 2010102511893; Dated Sep. 10, 2013.
CN Office Action dated May 26, 2014 for Appln No. 2012800018667.3.
CN Office Action for Application No. 201280018596.7 issued Jul. 7, 2014.
CN Office Action re Appln. No. 201010251189.3 dated Jun. 6, 2014.
Combined International Search and Exam Report for Application GB1407387.8 dated May 29, 2014.
Computer Giants Embrace On-Chip Optics; Mar. 27, 2008; [on-line]; Optics.org; [Retreived on Apr. 2, 2008]; Retreived from http://optics.org/cws/article/research/33521.
Cuypers, et al "Optical Measurement Techniques for Mobile and Large-Scale Dimensional Metrology" (2009) ; Optics and Lasers in Engineering pp. 292-300; vol. 47; Elsevier Ltd. XP 25914917A.
EOSpace—High-Speed Switches; [on-line technical brochure]; [Retrieved May 18, 2009]; Retrieved from http://www.cospace.com/Switches.htm.
Examination Report for GB Application No. GB1110252.2 dated Aug. 1, 2012, 5 pgs.

(56) References Cited

OTHER PUBLICATIONS

Examination Report for GB Application No. GB1110252.2 dated Jan. 9, 2013.
Examination Report for Great Britain Application No. GB1110252.2 dated May 24, 2013.
FARO Laser Tracker ION; 2 pages; revised Apr. 23, 2010; FARO Technologies, Inc., www.lasertracker.faro.com.
FARO Technical Institute, Basic Measurement Training Workbook, Version 1.0, FARO Laster Tracker, Jan. 2008, Students Book, FAO CAM2 Measure.
German Office Action for Application No. 102010038955.2 dated Apr. 23, 2014.
Great Britain Search Report for Application No. GB1013200.9 dated Nov. 22, 2010.
Hanwei Xiong et al: "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.
Hecht, Jeff, Photonic Frontiers: Gesture Recognition: Lasers Bring Gesture Recognition to the Home, Laser Focus World, pp. 1-5, [Retrieved On-Line Mar. 3, 2011], http://www.optoiq.com/optoiq-2/en-us/index/photonics-technologies-applications/lfw-display/lfw.
Hui, Elliot E., et al, "Single-Step Assembly of Complex 3-D Microstructures", Jan. 23, 2000, IEEE; pp. 602-607.
Integrated Optical Amplitude Modulator; [on-line technical data sheet]; [RetrievedOct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open.
International Preliminary Report of Patentability for International Application No. PCT/US2009/064758 filed Nov. 17, 2009.
International Preliminary Report on Patentability of the International Searching Authority for PCT No. PCT/US2012/024629; Date of report issuance Aug. 21, 2013.
International Preliminary Report on Patentability date of Issuance Sep. 3, 2013 for International Application Serial No. PCT/US2012/027083; International filing date Feb. 29, 2012.
International Preliminary Report on Patentability for Application No. PCT/US2012/031368 dated Oct. 15, 2013.
International Preliminary Report on Patentability for Application No. PCT/US2012/030225 dated Oct. 15, 2013.
International Preliminary Report on Patentability for Application No. PCT/US2012/033477 dated Oct. 15, 2013.
International Preliminary Report on Patentability for International Application Serial No. PCT/US2012/030835. International filing date Mar. 28, 2012. Date of Issuance Oct. 15, 2013.
International Preliminary Report on Patentability for International Application Serial No. PCT/US2012/032715. International filing date Apr. 9, 2012. Date of Issuance Oct. 15, 2013.
International Preliminary Report on Patentability for International Application Serial No. PCT/US2012/032970. International filing date Apr. 11, 2012. Date of Issuance Oct. 15, 2013.
International Preliminary Report on Patentability for International Application Serial No. PCT/US2012/032971. International filing date Apr. 11, 2012. Date of Issuance Oct. 15, 2013.
International Preliminary Report on Patentability for International Application Serial No. PCT/US2012/032972. International filing date Apr. 11, 2012. Date of Issuance Oct. 15, 2013.
International Preliminary Report on Patentability for International Application Serial No. PCT/US2012/032990. International filing date Apr. 11, 2012. Date of Issuance Oct. 15, 2013.
International Preliminary Report on Patentability for International Application Serial No. PCT/US2012/033435. International filing date Apr. 13, 2012. Date of Issuance Oct. 15, 2013.
International Preliminary Report on Patentability for International Application Serial No. PCT/US2012/033720. International filing date Apr. 16, 2012. Date of Issuance Oct. 15, 2013.
International Preliminary Report on Patentability of the International Searching Authority for Application No. PCT/US2013/022515 mailed Aug. 7, 2014.
International Search Report and Written Opinion dated Nov. 28, 2013 for Application No. PCT/US2013/049562.
International Search Report and Written Opinion for Application No. PCT/US2012/028984 dated Jul. 19, 2012.
International Search Report and Written Opinion for Application No. PCT/US2012/024629 dated May 5, 2012.
International Search Report and Written Opinion for Application No. PCT/US2012/032970 dated Nov. 28, 2012.
International Search Report of the International Searching Authority for Application No. PCT/US2012/070283; Date of Mailing Mar. 27, 2013.
Office Action for Chinese Patent Application No. 200980145893.6 Issued Oct. 15, 2012.
Office Action for Japanese Patent Application No. 2010-176909 filed Aug. 6, 2010; issued on Mar. 19, 2013.
Office Action for Japanese Patent Application No. 2010-176909 filed Aug. 6, 2010; issued on Oct. 23, 2012.
Office Action for Japanese Patent Application No. 2014-505151 filed Oct. 11, 2013; issued on Apr. 30, 2014.
Office Action for Japanese Patent Application No. PCT/US2012028984; Date of Mailing Feb. 17, 2012.
Optical Circulator (3-Ports & 4-Ports); [on-line technical data sheet]; Alliance Fiber Optic Products, Inc. REV.D Jan. 15, 2004; Retrieved from www.afop.com.
Optical Circulators Improve Bidirectional Fiber Systems; by Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirecti.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091.3286, DOI: 10.1117/1.2402517.
Parker, et al "Instrument for Setting Radio Telescope Surfaces" (4 pp) XP 55055817A.
PCMM System Specifications Leica Absolute Tracker and Lelca T-Products; Hexagon Metrology; Lelca Geosystems Metrology Products, Switzerland; 8 pages; www.leica-geosystems.com/metrology.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2.
Poujouly, Stephane, et al., Digital Laser Range Finder; Phase-Shift Estimation by Undersampling Technique; IEEE, Copyright 1999.
Rahman, et al., "Spatial-Geometric Approach to Physical Mobile Interaction Based on Accelerometer and IR Sensory Data Fusion", AC Transactions on Multimedia Computing, Communications and Applications, vol. 6, No. 4, Article 28, Publication date: Novembe.
RS Series Remote Controlled Optical Switch; [on-line technical data sheet]; Sercalo Microtechnology, Ltd. [Retrieved Oct. 14, 2010]; Retreived from http://www.sercalo.com/document/PDFs/DataSheets/RS%20datasheet.pdf.
Sladek, J., et al: "The Hybrid Contact-Optical Coordinate Measuring System." Measurement, vol. 44, No. 3, Mar. 1, 2011, pp. 503-510.
Stone, et al. "Automated Part Tracking on the Construction Job Site" 8 pp; XP 55055816A; National Institute of Standards and Technology.
Super-Nyquist Operation of the AD9912 Yields a High RF Output Signal; Analog Devices, Inc., AN-939 Application Note; www.analog.com; Copyright 2007.
Tracker3; Ultra-Portable Laser Tracking System; 4 pages; 2010 Automated Precision Inc.; www.apisensor.com.
Turk, et al., "Perceptual Interfaces", UCSB Technical Report 2003-33, pp. 1-43 [Retreived Aug. 11, 2011, http://www.cs.ucsb.edu/research/tech_reports/reports/2003-33.pdf](2003).
Written Opinion of the International Searching Authority for Application No. PCT/US2012/028984; Date of Mailing Jul. 19, 2012.
Written Opinion of the International Searching Authority for Application No. PCT/US2012/030225; Date of Mailing Sep. 28, 2012.
Written Opinion of the International Searching Authority for Application No. PCT/US2012/030835; Date of Mailing Jul. 23, 2012.
Written Opinion of the International Searching Authority for Application No. PCT/US2012/031368; Date of Mailing Jul. 18, 2012.

(56) References Cited

OTHER PUBLICATIONS

Written Opinion of the International Searching Authority for Application No. PCT/US2012/032971; Date of Mailing Sep. 3, 2012.
Written Opinion of the International Searching Authority for Application No. PCT/US2012/032990; Date of Mailing Dec. 4, 2012.
Written Opinion of the International Searching Authority for Application No. PCT/US2012/033435; Date of Mailing Sep. 17, 2012.
Written Opinion of the International Searching Authority for Application No. PCT/US2012/034611; Date of Mailing Dec. 13, 2012.
Written Opinion of the International Searching Authority for Application No. PCT/US2012/070283; Date of Mailing Mar. 27, 2013.
Written Opinion of the International Searching Authority for International Application No. PCT/US2014/020480 mailed Jun. 20, 2014.
Written Opinion of the International Searching Authority for International Application No. PCT/US2014/020485 mailed Jun. 20, 2014.
Written Opinion of the International Searching Authority for International Application No. PCT/US2011/033360 mailed Feb. 29, 2011.
Written Opinion of the International Searching Authority for PCT/US2012/032715; Date of Mailing Jul. 5, 2012.
Nanona High Speed & Low Loss Optical Switch; [on-line technical data sheet]; [Retrieved Oct. 14, 2010]; Retrieved from http://www.bostonati.com/products/PI-FOS.pdf.
CN Search Report for Application No. 201010251189.3 dated Jul. 11, 2012.
CN Search Report for Application No. 201280018596.7 dated Jun. 25, 2014.
CN Search Report for Appln No. 201280018667.3 dated May 16, 2014.
International Search Report and Written Opinion for Application No. PCT/US2012/027083 dated Jun. 29, 2012.
International Search Report and Written Opinion for Application No. PCT/US2012/032715 dated Jul. 5, 2012.
International Search Report and Written Opinion for Application No. PCT/US2012/033477 dated Jul. 20, 2012.
International Search Report and Written Opinion for Application No. PCT/US2012/033720 dated Sep. 16, 2012.
International Search Report and Written Opinion for Application No. PCT/US2013/059592 dated Dec. 10, 2013.
International Search Report and Written Opinion for Application No. PCT/US2014/020481 mailed Jun. 20, 2014.
International Search Report and Written Opinion for Application No. PCT/US2014/020487 mailed Jun. 20, 2014.
International Search Report and Written Opinion for Application No. PCT/US2014/020488 mailed Jun. 23, 2014.
International Search Report and Written Opinion for Application No. PCT/US2014/027035 mailed Jun. 20, 2014.
International Search Report and Written Opinion for Application No. PCT/US2011/033360 mailed Feb. 29, 2012.
International Search Report and Written Opinion for International Application No. PCT/US2009/064759, International Filing Date Nov. 17, 2009.
International Search Report and Written Opinion for PCT/US2012/032715 dated Jul. 5, 2012.
International Search Report for International Application No. PCT/US2011/033360 mailed Feb. 29, 2012.
International Search Report mailed Jun. 29, 2012 for International Application Serial No. PCT/US2012/027083; International filing date Feb. 29, 2012.
International Search Report mailed Mar. 19, 2013 for International Application Serial No. PCT/US2013/022515.
International Search report of the International Application No. PCT/US2013/049562 mailed Jun. 20, 2014.
International Search Report of the International Searching Authority for Application No. PCT/2012/030225; Date of Mailing Sep. 28, 2012.
International Search Report of the International Searching Authority for Application No. PCT/US2012/0033435; Date of Mailing Sep. 17, 2012.
International Search Report of the International Searching Authority for Application No. PCT/US2012/030835; Date of Mailing Jul. 23, 2012.
International Search Report of the International Searching Authority for Application No. PCT/US2012/031368; Date of Mailing Jul. 18, 2012.
International Search Report of the International Searching Authority for Application No. PCT/US2012/032990; Date of Mailing Dec. 4, 2012.
International Search Report of the International Searching Authority for Application No. PCT/US2012/034611; Date of Mailing Dec. 13, 2012.
International Search Report of the International Searching Authority, Mail Date Mar. 27, 2013.
Japanese Patent Application No. 2010-176909 date on Oct. 23, 2012.
JP Office Action for Patent Application No. 2014-505151 mailed Apr. 30, 2014.
Kester, Walt, Practical Analog Design Techniques, Analog Devices, Section 5, Undersampling Applications, Copyright 1995, pp. 5-1 to 5-34.
Kollorz, et al., "Gesture recognition with a time-of-flight camera", International Journal of Intelligent Systems Technologies and Applications, vol. 5, No. 3/4, pp. 334-343, [Retreived Aug. 11, 2011; http://www5.informatik.uni-erlangen.de/Forschung/Publikat.
LaserTRACER-measureing sub-micron in space; http://www.etalon-ag.com/index.php/en/products/lasertracer; 4 pages; Jun. 28, 2011; Etalon AG.
Leica Absolute Tracker AT401-ASME B89.4.19-2006 Specifications; Hexagon Metrology; Leica Geosystems Metrology Products, Switzerland; 2 pages; www.leica-geosystems.com/metrology.
Leica Geosystems AG ED—"Leica Laser Tracker System", Internet Citation, Jun. 28, 2012, XP002678836, Retrieved from the Internet: URL:http://www.a-solution.com.au/pages/downloads/LTD500_Brochure_EN.pdf.
Leica Geosystems Metrology, "Leica Absolute Tracker AT401, White Paper," Hexagon AB; 2010.
Leica Geosystems: "TPS1100 Professional Series", 1999, Retrieved from the Internet: URL:http://www.estig.ibeja.pt/-legvm/top_civil/TPS1100%20-%20A%20New%20Generation%20of%20Total%20Stations.pdf, [Retrieved on Jul. 2012] the whole document.
Leica Geosystems: "TPS1100 Professional Series", 1999, Retrieved from the Internet: URL: http://www.estig.ipbeja.pt/~legvm/top_civil/TPS1100%20-20A%20New%20Generation%20of%20Total%20Stations.pdf, [Retrieved on Jul. 2012].
Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).
Lightvision—High Speed Variable Optical Attenuators (VOA); [on-line]; A publication of Lightwaves 2020, Feb. 1, 2008; Retrieved from http://www.lightwaves2020.com/home/.
Maekynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, vol. 43, No. 1, Feb. 1, 1994,pp. 40-48, XP000460026, ISSN: 0018-9456, DOI 10.1109/19.286353, the whole document.
Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptica.
Matsumaru, K., "Mobile Robot with Preliminary-Announcement and Display Function of Forthcoming Motion Using Projection Equipment," Robot and Human Interactive Communications, 2006. RO-MAN06. The 15th IEEE International Symposium, pp. 443-450, Sep. 6-8.
MEMS Variable Optical Attenuators Single/Multi-Channel; [on-line]; Jan. 17, 2005; Retrieved from www.ozoptics.com
New River Kinematics, SA ARM—"The Ultimate Measurement Software for Arms, Software Release!", SA Sep. 30, 2010, [On-line],

(56) References Cited

OTHER PUBLICATIONS http://www.kinematics.com/news/software-release-sa20100930.html (1 of 14), [Retrieved Apr. 13, 2011 11:40:47 AM].

Burge, James H., et al, Use of a commerical laser tracker for optical alignment, Proc, of SPIE vol. 6676, Sep. 21, 2007, pp. 66760E-1-6 6760E-12.

Chen, Jihua, et al, Research on the Principle of 5/6-DOF Laser Tracking Metrology, Journal of Astronautic Metrology and Measurement vol. 27, No. 3, May 31, 2007, pp. 58-62.

Geng, Jason; "DLP-Based Structured Light 3D Imaging Technologies and Applications"; Proceedings of SPIE, vol. 7932. Published Feb. 11, 2011, 15 pages.

Katowski "Optical 3-D Measurement Techniques-Applications in inspection, quality control and robotic" Vienna, Austria, Sep. 18-20, 1989; 11 pages.

Newport Company "Fiber Optic Scribes" https://web.archive.org/web/20120903063012/http://www.newport.com/Fiber-Optic-Scribes/835171/1033/info.aspx; 2012, 2 pages.

Newport Corporation "Projects in Fiber Optics: Applications Handbook", 1986; 3 pages.

Takeuchi et al., "Ultraprecision 3D Micromachining of Glass"; Annals of the CIRP; Jan. 4, 1996; vol. 45; 401-404 pages.

Thorlabs "Ruby Dualscribe Fiber Optic Scribe" a Mechanical Drawing, 2014, 1 page.

International Search Report and Written Opinion for Application No. PCT/US2015/056829 dated Feb. 1, 2016; 18 pgs.

\* cited by examiner

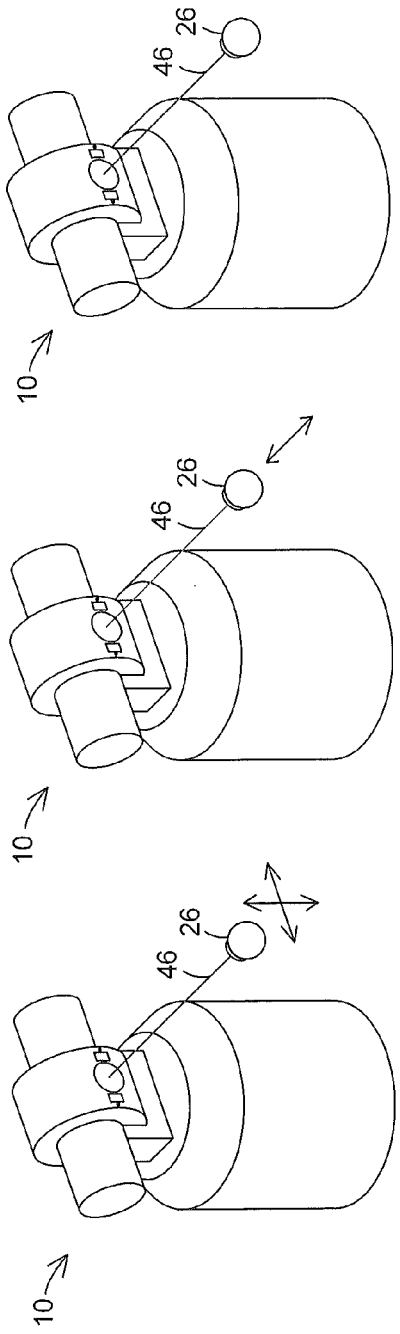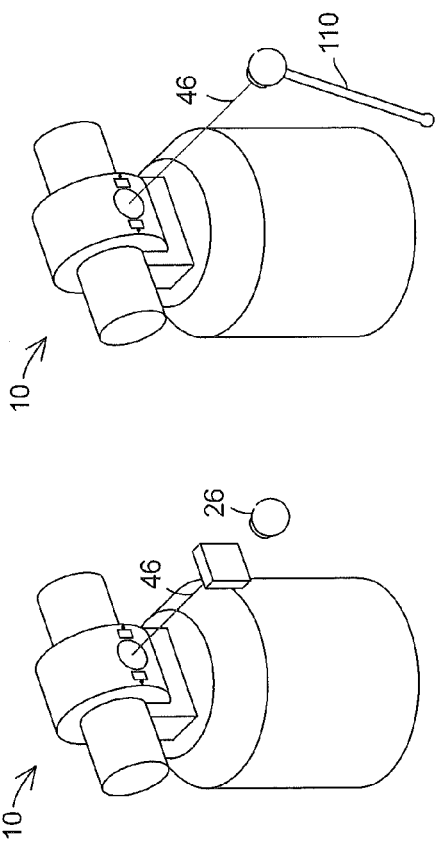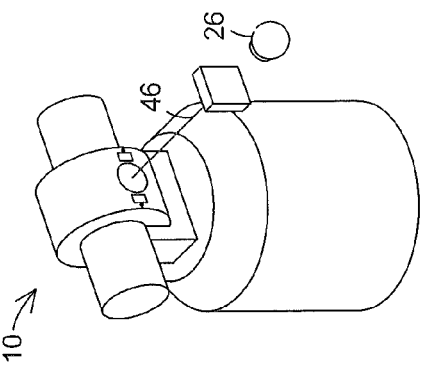

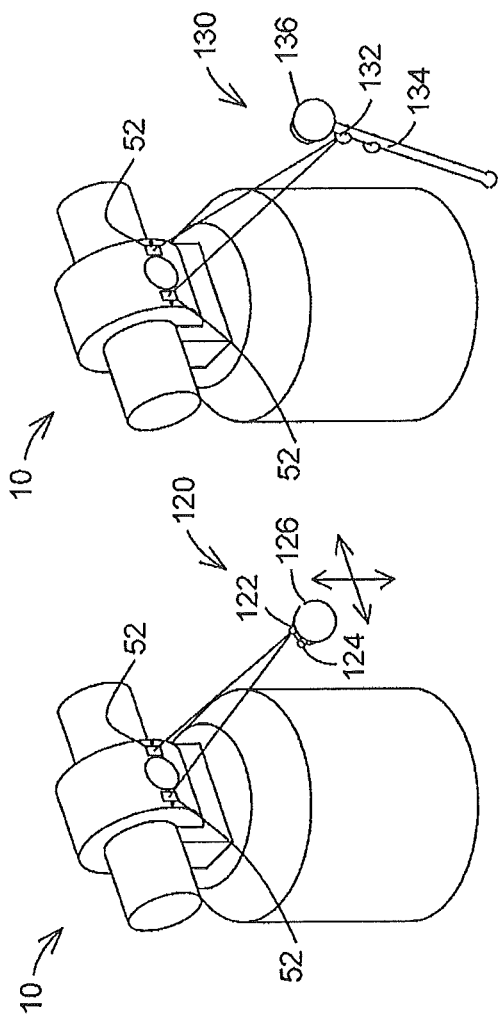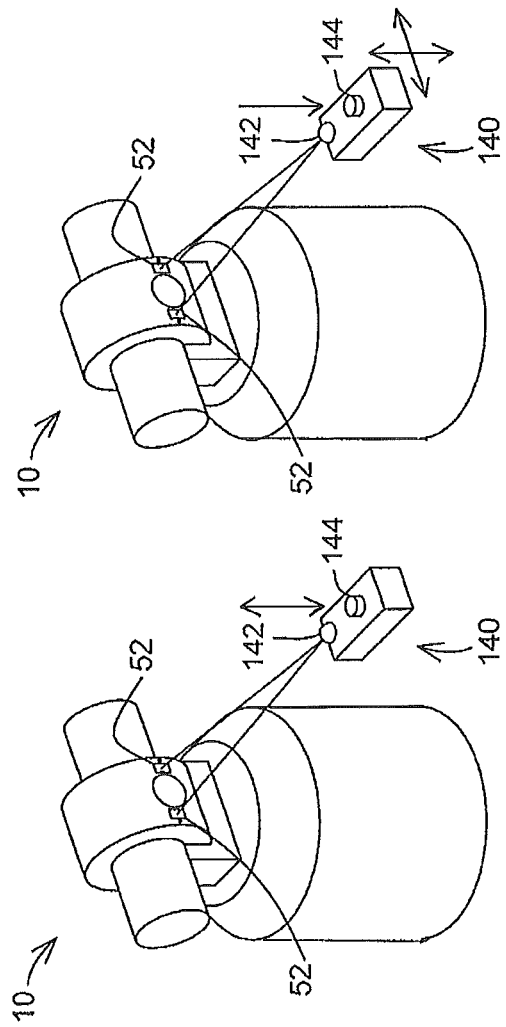

| Command | Software shortcut | Example 1 gesture | Example 2 gesture |
|---|---|---|---|
| Cancel | Esc |  | |
| Measure a Comp Off Point | F2 |  | |
| Measure a Comp Axis Point | ! |  | |
| Measure a Plane | F3 |  |  |
| Measure a 2D Line | F4 | 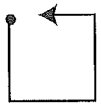 |  |
| Measure a Circle | F10 |  |  |
| Measure a Cylinder | F8 | 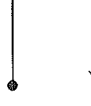 |  |
| Measure a Sphere | F12 |  |  |
| Change SMR | P |  | 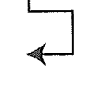 |
| Reset Interferometer | T | 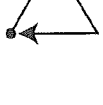 | |
FIGURE 8

| Command | Software shortcut | Example 1 gesture | Example 2 gesture |
|---|---|---|---|
| Set Distance Mode | N |  |  |
| Search | S |  |  |
| Toggle Single Point/ Scan Modes | X |  |  |
| Material Thickness | M | 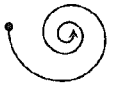 |  |
| Collect Reading | Insert |  |  |
| Compensation Point | Home |  |  |
| Remove Reading | ← |  | |
| Autoadjust Using SMR | N/A |  |  |
| Autoadjust Using Internal Retroreflector | N/A |  |  |
| Initialize Command Tablet | N/A |  | |
FIGURE 9

| Command | Software shortcut | Example 1 gesture | Example 2 gesture |
|---|---|---|---|
| Set Reference Point | N/A | 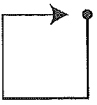 | |
| User Defined 1 | N/A | 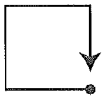 | |
| User Defined 2 | N/A | 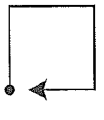 | |
| User Defined 3 | N/A |  | |
| User Defined 4 | N/A | 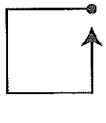 | |
| User Defined 5 | N/A | 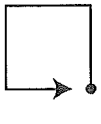 | |
| User Defined 6 | N/A | 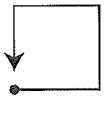 | |
| Acquire SMR | N/A | 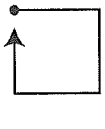 | |
FIGURE 10

| | | | | | |
|---|---|---|---|---|---|
| ⊕ | Cancel | Measure a Comp Off Point | Measure a Comp Axis Point | Measure a Plane | ⊕ |
| Measure a 2D Line | Measure a Circle | Measure a Cylinder | Measure a Sphere | Change SMR | Reset Interferometer |
| Set Distance Mode | Toggle Set Point/ Scan Modes | Material Thickness | Collect Reading | Comp Point | Remove Reading |
| Autoadjust ADM Using SMR | Autoadjust ADM Using Internal Retro | Set Reference Point | Pin Nest | Edge Nest | Flat Nest |
| 0.5" SMR | 0.875" SMR | 1.5" SMR | User Defined 1 | User Defined 2 | User Defined 3 |
| Left | Right | Lower | Upper | Inner | Outer |
| 1 | 2 | 3 | 4 | 5 | 6 |
| ⊕ | 7 | 8 | 9 | 0 | . |

FIGURE 12

METHOD AND APPARATUS FOR LOCKING ONTO A RETROREFLECTOR WITH A LASER TRACKER

CROSS REFERENCE TO RELATED APPLICATIONS

This application is a continuation-in-part of U.S. application Ser. No. 14/180,900, filed 14 Feb. 2014, which is a divisional of Ser. No. 13/803,479, filed on Mar. 14, 2013. U.S. application Ser. No. 13/803,479 is a divisional application of U.S. patent application Ser. No. 13/090,889, filed on Apr. 20, 2011, which claims the benefit of U.S. Provisional Application No. 61/326,294, filed on Apr. 21, 2010, the entire contents of which are incorporated herein by reference.

BACKGROUND

The present disclosure relates to a coordinate measuring device. One set of coordinate measurement devices belongs to a class of instruments that measure the three-dimensional (3D) coordinates of a point by sending a laser beam to the point, where it is intercepted by a retroreflector target. The instrument finds the coordinates of the point by measuring the distance and the two angles to the target. The distance is measured with a distance-measuring device such as an absolute distance meter (ADM) or an interferometer. The angles are measured with an angle-measuring device such as an angular encoder. A gimbaled beam-steering mechanism within the instrument directs the laser beam to the point of interest. An example of such a device is a laser tracker. Exemplary laser tracker systems are described by U.S. Pat. No. 4,790,651 to Brown et al., incorporated by reference herein, and U.S. Pat. No. 4,714,339 to Lau et al.

A coordinate-measuring device closely related to the laser tracker is the total station. The total station, which is most often used in surveying applications, may be used to measure the coordinates of diffusely scattering or retroreflective targets. Hereinafter, the term laser tracker is used in a broad sense to include total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The apex of the cube corner, which is the common point of intersection of the three mirrors, is located at the center of the sphere. It is common practice to place the spherical surface of the SMR in contact with an object under test and then move the SMR over the surface being measured. Because of this placement of the cube corner within the sphere, the perpendicular distance from the apex of the cube corner to the surface of the object under test remains constant despite rotation of the SMR. Consequently, the 3D coordinates of a surface can be found by having a tracker follow the 3D coordinates of an SMR moved over the surface. It is possible to place a glass window on the top of the SMR to prevent dust or dirt from contaminating the glass surfaces. An example of such a glass surface is shown in U.S. Pat. No. 7,388,654 to Raab et al., incorporated by reference herein.

A gimbal mechanism within the laser tracker may be used to direct a laser beam from the tracker to the SMR. Part of the light retroreflected by the SMR enters the laser tracker and passes onto a position detector. The position of the light that hits the position detector is used by a tracker control system to adjust the rotation angles of the mechanical azimuth and zenith axes of the laser tracker to keep the laser beam centered on the SMR. In this way, the tracker is able to follow (track) the SMR.

Angular encoders attached to the mechanical azimuth and zenith axes of the tracker may measure the azimuth and zenith angles of the laser beam (with respect to the tracker frame of reference). The one distance measurement and two angle measurements performed by the laser tracker are sufficient to completely specify the three-dimensional location of the SMR.

As mentioned previously, two types of distance meters may be found in laser trackers: interferometers and absolute distance meters (ADMs). In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between targets. Because of this, the ADM is said to be capable of "point-and-shoot" measurement. Initially, absolute distance meters were only able to measure stationary targets and for this reason were always used together with an interferometer. However, some modern absolute distance meters can make rapid measurements, thereby eliminating the need for an interferometer. Such an ADM is described in U.S. Pat. No. 7,352,446 to Bridges et al., incorporated by reference herein.

In its tracking mode, the laser tracker will automatically follow movements of the SMR when the SMR is in the capture range of the tracker. If the laser beam is broken, tracking will stop. The beam may be broken by any of several means: (1) an obstruction between the instrument and SMR; (2) rapid movements of the SMR that are too fast for the instrument to follow; or (3) the direction of the SMR being turned beyond the acceptance angle of the SMR. By default, following the beam break, the beam remains fixed at the point of the beam break or at the last commanded position. It may be necessary for an operator to visually search for the tracking beam and place the SMR in the beam in order to lock the instrument onto the SMR and continue tracking.

Some laser trackers include one or more cameras. A camera axis may be coaxial with the measurement beam or offset from the measurement beam by a fixed distance or angle. A camera may be used to provide a wide field of view to locate retroreflectors. A modulated light source placed near the camera optical axis may illuminate retroreflectors, thereby making them easier to identify. In this case, the retroreflectors flash in phase with the illumination, whereas background objects do not. One application for such a camera is to detect multiple retroreflectors in the field of view and measure each in an automated sequence. Exemplary systems are described in U.S. Pat. No. 6,166,809 to Pettersen et al., and U.S. Pat. No. 7,800,758 to Bridges et al., incorporated by reference herein.

Some laser trackers have the ability to measure with six degrees of freedom (DOF), which may include three coordinates, such as x, y, and z, and three rotations, such as pitch, roll, and yaw. Several systems based on laser trackers are available or have been proposed for measuring six degrees of freedom. Exemplary systems are described in U.S. Published Patent Application No. 2010/0128259 to Bridges, incorporated by reference herein; U.S. Pat. No. 7,800,758 to Bridges et al., U.S. Pat. No. 5,973,788 to Pettersen et al.; and U.S. Pat. No. 7,230,689 to Lau.

User Control of Laser Tracker Functionality

Two common modes of operation of the laser tracker are tracking mode and profiling mode. In tracking mode, the laser beam from the tracker follows the retroreflector as the operator moves it around. In profiling mode, the laser beam from the tracker goes in the direction given by the operator, either through computer commands or manual action.

Besides these modes of operation that control the basic tracking and pointing behavior of the tracker, there are also special option modes that enable the tracker to respond in a manner selected by the operator ahead of time. The desired option mode is typically selected in software that controls the laser tracker. Such software may reside in an external computer attached to the tracker (possibly through a network cable) or within the tracker itself. In the latter case, the software may be accessed through console functionality built into the tracker.

An example of an option mode is the Auto Reset mode in which the laser beam is driven to a preset reference point whenever the laser beam is broken. One popular reference point for the Auto Reset option mode is the tracker Home Position, which is the position of a magnetic nest mounted on the tracker body. The alternative to Auto Reset is the No Reset option mode. In this case, the laser beam continues pointing in the original direction whenever the laser beam is broken. A description of the tracker home position is given in U.S. Pat. No. 7,327,446 to Cramer et al., incorporated by reference herein.

Another example of a special option mode is PowerLock, a feature offered by Leica Geosystems on their Leica Absolute Tracker™. In the PowerLock option mode, the location of the retroreflector is found by a tracker camera whenever the tracker laser beam is broken. The camera immediately sends the angular coordinates of the retroreflector to the tracker control system, thereby causing the tracker to point the laser beam back at the retroreflector. Methods involving automatic acquisition of a retroreflector are given in international application WO 2007/079601 to Dold et al. and U.S. Pat. No. 7,055,253 to Kaneko.

Some option modes are slightly more complex in their operation. An example is the Stability Criterion mode, which may be invoked whenever an SMR is stationary for a given period of time. The operator may track an SMR to a magnetic nest and set it down. If a stability criterion is active, the software will begin to look at the stability of the three-dimensional coordinate readings of the tracker. For instance, the user may decide to judge the SMR to be stable if the peak-to-peak deviation in the distance reading of the SMR is less than two micrometers over a one second interval. After the stability criterion is satisfied, the tracker measures the 3D coordinates and the software records the data.

More complex modes of operation are possible through computer programs. For example, software is available to measure part surfaces and fit these to geometrical shapes. Software will instruct the operator to move the SMR over the surface and then, when finished collecting data points, to raise the SMR off the surface of the object to end the measurement. Moving the SMR off the surface not only indicates that the measurement is completed; it also indicates the position of the SMR in relation to the object surface. This position information is needed by the application software to properly account for the offset caused by the SMR radius.

A second example of complex computer control is a tracker survey. In the survey, the tracker is driven sequentially to each of several target locations according to a prearranged schedule. The operator may teach these positions prior to the survey by carrying the SMR to each of the desired positions.

A third example of complex software control is tracker directed measurement. The software directs the operator to move the SMR to a desired location. It does this using a graphic display to show the direction and distance to the desired location. When the operator is at the desired position, the color on the computer monitor might, for example, turn from red to green.

The element common to all tracker actions described above is that the operator is limited in his ability to control the behavior of the tracker. On the one hand, option modes selected in the software may enable the operator to preset certain behaviors of the tracker. However, once the option modes have been selected by the user, the behavior of the tracker is established and cannot be changed unless the operator returns to the computer console. On the other hand, the computer program may direct the operator to carry out complicated operations that the software analyzes in a sophisticated way. In either case, the operator is limited in his ability to control the tracker and the data collected by the tracker.

Need for Remote Tracker Commands

A laser tracker operator performs two fundamental functions. He positions an SMR during a measurement, and he sends commands through the control computer to the tracker. However, it is not easy for one operator to perform both of these measurement functions because the computer is usually far away from the measurement location. Various methods have been tried to get around this limitation, but none is completely satisfactory.

One method sometimes used is for a single operator to set the retroreflector in place and walk back to the instrument control keyboard to execute a measurement instruction. However, this is an inefficient use of operator and instrument time. In cases where the operator must hold the retroreflector for the measurement, single operator control is only possible when the operator is very close to the keyboard.

A second method is to add a second operator. One operator stands by the computer and a second operator moves the SMR. This is obviously an expensive method and verbal communication over large distances can be a problem.

A third method is to equip a laser tracker with a remote control. However, remote controls have several limitations. Many facilities do not allow the use of remote controls for safety or security reasons. Even if remote controls are allowed, interference among wireless channels may be a problem. Some remote control signals do not reach the full range of the laser tracker. In some situations, such as working from a ladder, the second hand may not be free to operate the remote control. Before a remote control can be used, it is usually necessary to set up the computer and remote control to work together, and then only a small subset of tracker commands can ordinarily be accessed at any given time. An example of a system based on this idea is given in U.S. Pat. No. 7,233,316 to Smith et al.

A fourth method is to interface a cell phone to a laser tracker. Commands are entered remotely by calling the instrument from the cell phone and entering numbers from the cell phone keypad or by means of voice recognition. This method also has many shortcomings. Some facilities do not allow cell phones to be used, and cell phones may not be available in rural areas. Service requires a monthly service provider fee. A cell phone interface requires additional hardware interfacing to the computer or laser tracker. Cell phone technology changes fast and may require upgrades. As in the case of remote controls, the computer and remote control must be set up to work together, and only a small subset of tracker commands can ordinarily be accessed at a given time.

A fifth method is to equip a laser tracker with internet or wireless network capabilities and use a wireless portable computer or personal digital assistant (PDA) to communicate commands to the laser tracker. However, this method has limitations similar to a cell phone. This method is often used with total stations. Examples of systems that use this method include U.S. Published Patent Application No. 2009/017618 to Kumagai et al., U.S. Pat. No. 6,034,722 to Viney et al., U.S. Pat. No. 7,423,742 to Gatsios et al., U.S. Pat. No. 7,307,710 to Gatsios et al., U.S. Pat. No. 7,552,539 to Piekutowski, and U.S. Pat. No. 6,133,998 to Monz et al. This method has also been used to control appliances by a method described in U.S. Pat. No. 7,541,965 to Ouchi et al.

A sixth method is to use a pointer to indicate a particular location in which a measurement is to be made. An example of this method is given in U.S. Pat. No. 7,022,971 to Ura et al. It might be possible to adapt this method to give commands to a laser tracker, but it is not usually very easy to find a suitable surface upon which to project the pointer beam pattern.

A seventh method is to devise a complex target structure containing at least a retroreflector, transmitter, and receiver. Such systems may be used with total stations to transmit precise target information to the operator and also to transmit global positioning system (GPS) information to the total station. An example of such a system is given in U.S. Published Patent Application No. 2008/0229592 to Hinderling et al. In this case, no method is provided to enable the operator to send commands to the measurement device (total station).

An eighth method is to devise a complex target structure containing at least a retroreflector, transmitter and receiver, where the transmitter has the ability to send modulated light signals to a total station. A keypad can be used to send commands to the total station by means of the modulated light. These commands are decoded by the total station. Examples of such systems are given in U.S. Pat. No. 6,023,326 to Katayama et al., U.S. Pat. No. 6,462,810 to Muraoka et al., U.S. Pat. No. 6,295,174 to Ishinabe et al., and U.S. Pat. No. 6,587,244 to Ishinabe et al. This method is particularly appropriate for surveying applications in which the complex target and keypad are mounted on a large staff. Such a method is not suitable for use with a laser tracker, where it is advantageous to use a small target not tethered to a large control pad. Also it is desirable to have the ability to send commands even when the tracker is not locked onto a retroreflector target.

A ninth method is to include both a wireless transmitter and a modulated light source on the target to send information to a total station. The wireless transmitter primarily sends information on the angular pose of the target so that the total station can turn in the proper direction to send its laser beam to the target retroreflector. The modulated light source is placed near the retroreflector so that it will be picked up by the detector in the total station. In this way, the operator can be assured that the total station is pointed in the right direction, thereby avoiding false reflections that do not come from the target retroreflector. An exemplary system based on this approach is given in U.S. Pat. No. 5,313,409 to Wiklund et al. This method does not offer the ability to send general purpose commands to a laser tracker.

A tenth method is to include a combination of wireless transmitter, compass assembly in both target and total station, and guide light transmitter. The compass assembly in the target and total station are used to enable alignment of the azimuth angle of the total station to the target. The guide light transmitter is a horizontal fan of light that the target can pan in the vertical direction until a signal is received on the detector within the total station. Once the guide light has been centered on the detector, the total station adjusts its orientation slightly to maximize the retroreflected signal. The wireless transmitter communicates information entered by the operator on a keypad located at the target. An exemplary system based on this method is given in U.S. Pat. No. 7,304,729 to Wasutomi et al. This method does not offer the ability to send general purpose commands to a laser tracker.

An eleventh method is to modify the retroreflector to enable temporal modulation to be imposed on the retroreflected light, thereby transmitting data. The inventive retroreflector comprises a cube corner having a truncated apex, an optical switch attached to the front face of the cube corner, and electronics to transmit or receive data. An exemplary system of this type is given in U.S. Pat. No. 5,121,242 to Kennedy. This type of retroreflector is complex and expensive. It degrades the quality of the retroreflected light because of the switch (which might be a ferro-electric light crystal material) and because of the truncated apex. Also, the light returned to a laser tracker is already modulated for use in measuring the ADM beam, and switching the light on and off would be a problem, not only for the ADM, but also for the tracker interferometer and position detector.

A twelfth method is to use a measuring device that contains a bidirectional transmitter for communicating with a target and an active retroreflector to assist in identifying the retroreflector. The bidirectional transmitter may be wireless or optical and is part of a complex target staff that includes the retroreflector, transmitter, and control unit. An exemplary system of this type is described in U.S. Pat. No. 5,828,057 to Hertzman et al. Such a method is not suitable for use with a laser tracker, where it is advantageous to use a small target not tethered to a large control pad. Also the method of identifying the retroreflector target of interest is complicated and expensive.

There is a need for a simple method for an operator to communicate commands to a laser tracker from a distance. It is desirable that the method be: (1) useable without a second operator; (2) useable over the entire range of the laser tracker; (3) useable without additional hardware interfacing; (4) functional in all locations; (5) free of service provider fees; (6) free of security restrictions; (7) easy to use without additional setup or programming; (8) capable of initiating a wide range of simple and complex tracker commands; (9) useable to call a tracker to a particular target among a plurality of targets; and (10) useable with a minimum of additional equipment for the operator to carry.

SUMMARY

According to an embodiment of the present invention, a three-dimensional (3D) coordinate measurement system includes: a communication device that includes a first light source and an operator-controlled unit, the operator-controlled unit configured to control emission from the first light source; a retroreflector separate from the communication device; a laser tracker including: a structure rotatable about a first axis and a second axis; a first camera; a second light source; second camera proximate the second light source, the second camera having a narrower field-of-view than the first camera; and a processor operable to: cause the first camera to capture a first light emitted by the first light source in a first digital image; determine that a retroreflector lock-in command has been given based at least in part on the first digital image; respond to the retroreflector lock-in command having been given by: activating the second light source to produce a second light reflected by the retroreflector as a second reflected light; capturing the second reflected light with the second camera to produce a second digital image; and steering the structure based at least in part on the second digital image.

According to another embodiment of the present invention, a method is provided for locking on a retroreflector with a laser tracker. The method includes: providing a communication device, the retroreflector, and the laser tracker, the communication device including a first light source and an operator-controlled unit, the operator-controlled unit configured to control emission of a first light from the first light source, the retroreflector separate from the communication device, the laser tracker including a structure, a distance meter, a first angular encoder, a second angular encoder, a first camera, a second camera, a second light source, a position detector, a processor, and a third light source, the structure rotatable about a first axis and a second axis, the second camera proximate the second light source, the second camera having a narrower field-of-view than the first camera, the first camera and the second camera affixed to an external portion of the structure, the position detector internal to the tracker; emitting the first light from the communication device; capturing the first light with the first camera to produce a first digital image; determining by the processor, based at least in part on the first digital image, that a lock-in command has been given and in response activating the second light source to produce second light; reflecting from the retroreflector a portion of the second light as second reflected light; capturing the second reflected light with the second camera to produce a second digital image; launching a third light beam from the third light source; steering the structure to direct the third light beam to the retroreflector, the steering based at least in part on one of the second digital image and a reading of the position detector; reflecting a portion of the third light beam as a third reflected light; capturing a first part of the third reflected light with the position detector; capturing a second part of the third reflected light with the distance meter; determining with the processor a first distance to the retroreflector based at least in part on the second part of the third reflected light; measuring with the first angular encoder a first angle of rotation about the first axis; measuring with the second angular encoder a second angle of rotation about the second axis; determining with the processor three-dimensional (3D) coordinates of the retroreflector based at least in part on the first distance, the first angle of rotation, and the second angle of rotation; and storing the 3D coordinates.

BRIEF DESCRIPTION OF THE DRAWINGS

Referring now to the drawings, wherein like elements are numbered alike in the several FIGURES;

FIGS. 3A-3E illustrate ways in which a passive target can be used to convey gestural information through the tracking and measuring systems of the laser tracker;

FIGS. 5A-5D illustrate ways in which an active target can be used to convey gestural information through the camera system of a laser tracker;

FIGS. 8-10 show a selection of laser tracker commands and corresponding gestures that might be used by the operator to convey these commands to the laser tracker;

FIG. 12 shows an exemplary command tablet for transmitting commands to a laser tracker by means of gestures;

DETAILED DESCRIPTION OF THE PREFERRED EMBODIMENTS

Figure 1:
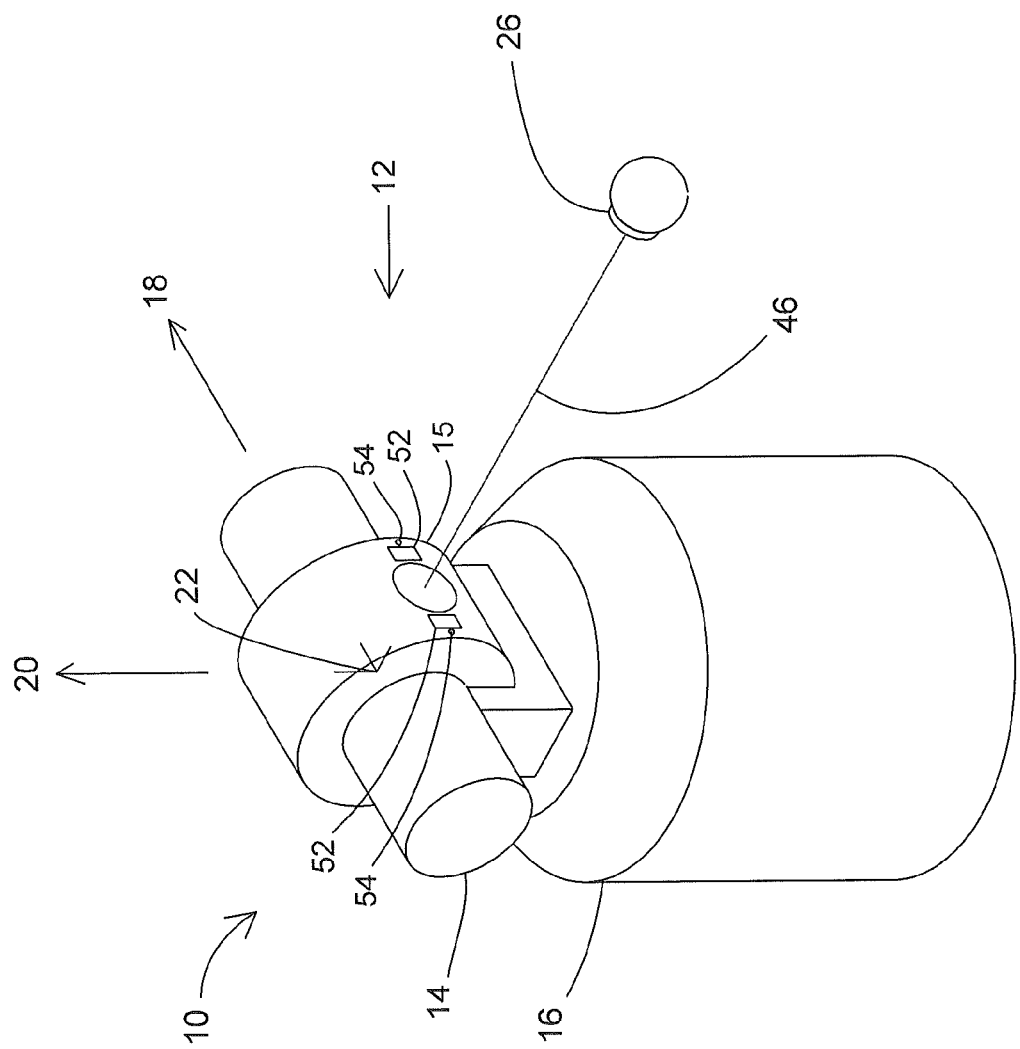
FIG. 1 shows a perspective view of an exemplary laser tracker.

An exemplary laser tracker 10 is illustrated in FIG. 1. An exemplary gimbaled beam-steering mechanism 12 of laser tracker 10 comprises zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in the plane normal to zenith axis 18. Laser beam 46 is pointed in the desired direction by motors within the tracker (not shown) that rotate payload 15 about zenith axis 18 and azimuth axis 20. Zenith and azimuth angular encoders, internal to the tracker (not shown), are attached to zenith mechanical axis 18 and azimuth mechanical axis 20 and indicate, to high accuracy, the angles of rotation. Laser beam 46 travels to external retroreflector 26 such as the spherically mounted retroreflector (SMR) described above. By measuring the radial distance between gimbal point 22 and retroreflector 26 and the rotation angles about the zenith and azimuth axes 18, 20, the position of retroreflector 26 is found within the spherical coordinate system of the tracker.

Laser beam 46 may comprise one or more laser wavelengths. For the sake of clarity and simplicity, a steering mechanism of the sort shown in FIG. 1 is assumed in the following discussion. However, other types of steering mechanisms are possible. For example, it would be possible to reflect a laser beam off a mirror rotated about the azimuth and zenith axes. An example of the use of a mirror in this way is given in U.S. Pat. No. 4,714,339 to Lau et al. The techniques described here are applicable, regardless of the type of steering mechanism.

In exemplary laser tracker 10, cameras 52 and light sources 54 are located on payload 15. Light sources 54 illuminate one or more retroreflector targets 26. Light sources 54 may be LEDs electrically driven to repetitively emit pulsed light. Each camera 52 comprises a photosensitive array and a lens placed in front of the photosensitive array. The photosensitive array may be a CMOS or CCD array. The lens may have a relatively wide field of view, say thirty or forty degrees. The purpose of the lens is to form an image on the photosensitive array of objects within the field of view of the lens. Each light source 54 is placed near camera 52 so that light from light source 54 is reflected off each retroreflector target 26 onto camera 52. In this way, retroreflector images are readily distinguished from the background on the photosensitive array as their image spots are brighter than background objects and are pulsed. There may be two cameras 52 and two light sources 54 placed about the line of laser beam 46. By using two cameras in this way, the principle of triangulation can be used to find the three-dimensional coordinates of any SMR within the field of view of the camera. In addition, the three-dimensional coordinates of the SMR can be monitored as the SMR is moved from point to point. A use of two cameras for this purpose is described in U.S. Published Patent Application No. 2010/0128259 to Bridges.

Other arrangements of one or more cameras and light sources are possible. For example, a light source and camera can be coaxial or nearly coaxial with the laser beams emitted by the tracker. In this case, it may be necessary to use optical filtering or similar methods to avoid saturating the photosensitive array of the camera with the laser beam from the tracker.

Another possible arrangement is to use a single camera located on the payload or base of the tracker. A single camera, if located off the optical axis of the laser tracker, provides information about the two angles that define the direction to the retroreflector but not the distance to the retroreflector. In many cases, this information may be sufficient. If the 3D coordinates of the retroreflector are needed when using a single camera, one possibility is to rotate the tracker in the azimuth direction by 180 degrees and then to flip the zenith axis to point back at the retroreflector. In this way, the target can be viewed from two different directions and the 3D position of the retroreflector can be found using triangulation.

Figure 18:
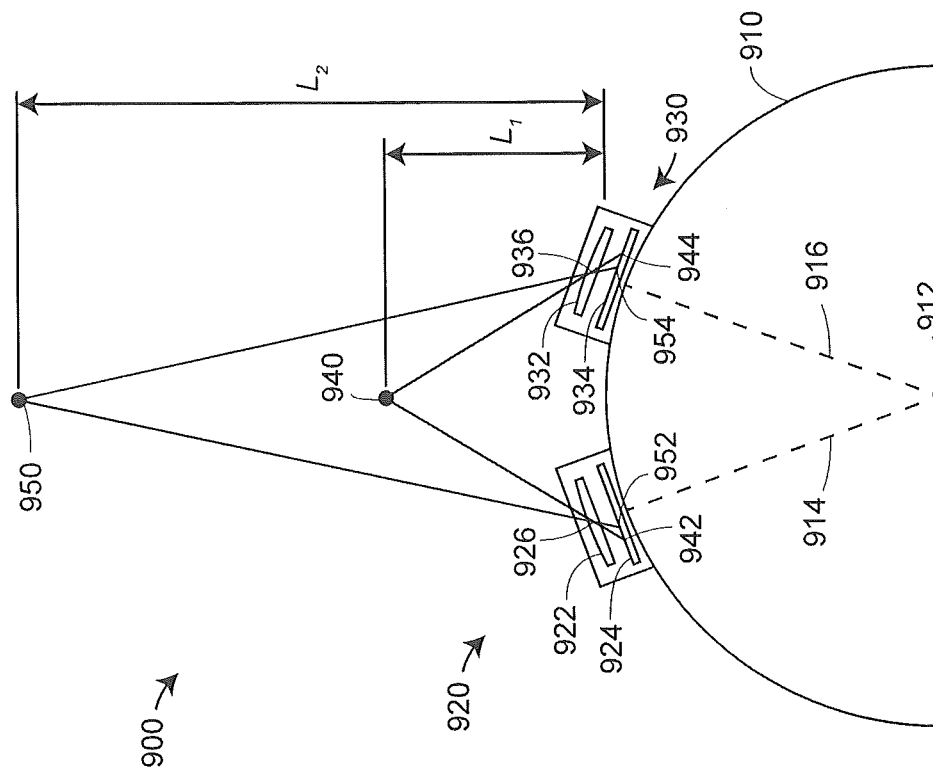
FIG. 18 shows an exemplary geometry that enables finding of three dimensional coordinates of a target using a camera located off the optical axis of a laser tracker.

A more general approach to finding the distance to a retroreflector with a single camera is to rotate the laser tracker about either the azimuth axis or the zenith axis and observe the retroreflector with a camera located on the tracker for each of the two angles of rotation. The retroreflector may be illuminated, for example, by an LED located close to the camera. FIG. 18 shows how this procedure can be used to find the distance to the retroreflector. The test setup 900 includes a laser tracker 910, a camera 920 in a first position, a camera 930 in a second position, and a retroreflector in a first position 940 and a second position 950. The camera is moved from the first position to the second position by rotating the laser tracker 910 about the tracker gimbal point 912 about the azimuth axis, the zenith axis, or both the azimuth axis and the zenith axis. The camera 920 includes a lens system 922 and a photosensitive array 924. The lens system 922 has a perspective center 926 through which rays of light from the retroreflectors 940, 950 pass. The camera 930 is the same as the camera 920 except rotated into a different position. The distance from the surface of the laser tracker 910 to the retroreflector 940 is $L_1$ and the distance from the surface of the laser tracker to the retroreflector 950 is $L_2$. The path from the gimbal point 912 to the perspective center 926 of the lens 922 is drawn along the line 914. The path from the gimbal point 916 to the perspective center 936 of the lens 932 is drawn along the line 916. The distances corresponding to the lines 914 and 916 have the same numerical value. As can be seen from FIG. 18, the nearer position of the retroreflector 940 places an image spot 942 farther from the center of the photosensitive array than the image spot 952 corresponding to the photosensitive array 950 at the distance farther from the laser tracker. This same pattern holds true for the camera 930 located following the rotation. As a result, the distance between the image points of a nearby retroreflector 940 before and after rotation is larger than the distance between the image points of a far away retroreflector 950 before and after rotation. By rotating the laser tracker and noting the resulting change in position of the image spots on the photosensitive array, the distance to the retroreflector can be found. The method for finding this distance is easily found using trigonometry, as will be obvious to one of ordinary skill in the art.

Another possibility is to switch between measuring and imaging of the target. An example of such a method is described in U.S. Pat. No. 7,800,758 to Bridges et al. Other camera arrangements are possible and can be used with the methods described herein.

Figure 2:
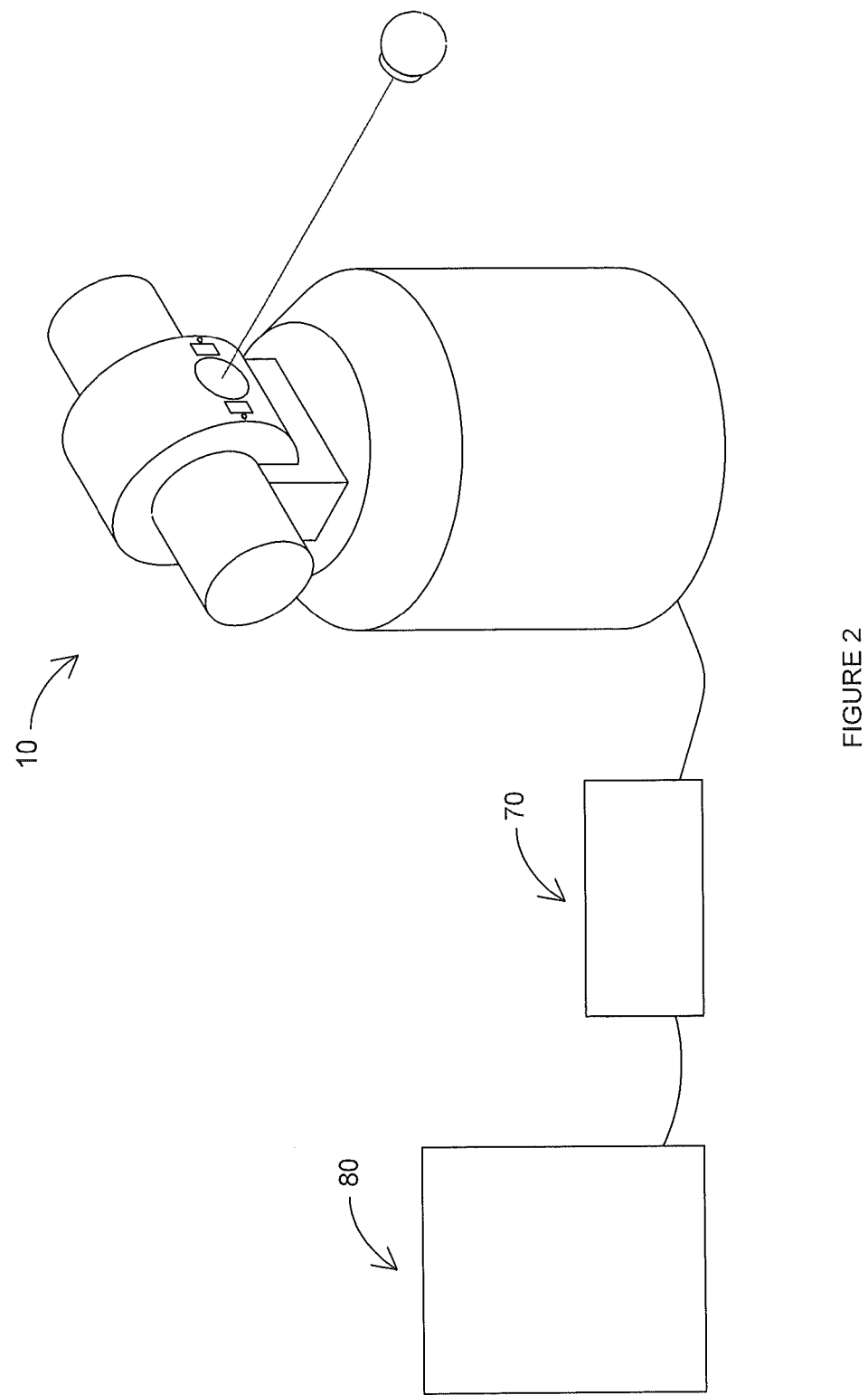
FIG. 2 shows computing and power supply elements attached to exemplary laser tracker.

As shown in FIG. 2, auxiliary unit 70 is usually a part of laser tracker 10. The purpose of auxiliary unit 70 is to supply electrical power to the laser tracker body and in some cases to also supply computing and clocking capability to the system. It is possible to eliminate auxiliary unit 70 altogether by moving the functionality of auxiliary unit 70 into the tracker body. In most cases, auxiliary unit 70 is attached to general purpose computer 80. Application software loaded onto general purpose computer 80 may provide application capabilities such as reverse engineering. It is also possible to eliminate general purpose computer 80 by building its computing capability directly into laser tracker 10. In this case, a user interface, possibly providing keyboard and mouse functionality is built into laser tracker 10. The connection between auxiliary unit 70 and computer 80 may be wireless or through a cable of electrical wires. Computer 80 may be connected to a network, and auxiliary unit 70 may also be connected to a network. Plural instruments, for example, multiple measurement instruments or actuators, may be connected together, either through computer 80 or auxiliary unit 70.

The laser tracker 10 may be rotated on its side, rotated upside down, or placed in an arbitrary orientation. In these situations, the terms azimuth axis and zenith axis have the same direction relative to the laser tracker as the directions shown in FIG. 1 regardless of the orientation of the laser tracker 10.

In another embodiment, the payload 15 is replaced by a mirror that rotates about the azimuth axis 20 and the zenith axis 18. A laser beam is directed upward and strikes the mirror, from which it launches toward a retroreflector 26.

Sending Commands to the Laser Tracker from a Distance

FIGS. 3A-3E, 4A-4C, and 5A-5D demonstrate sensing means by which the operator may communicate gestural patterns that are interpreted and executed as commands by exemplary laser tracker 10. FIGS. 3A-3E demonstrate sensing means by which the operator communicates gestural patterns that exemplary laser tracker 10 interprets using its tracking and measuring systems. FIG. 3A shows laser tracker 10 emitting laser beam 46 intercepted by retroreflector target 26. As target 26 is moved side to side, the laser beam from the tracker follows the movement. At the same time, the angular encoders in tracker 10 measure the angular position of the target in the side-to-side and up-down directions. The angular encoder readings form a two dimensional map of angles that can be recorded by the tracker as a function of time and analyzed to look for patterns of movement.

FIG. 3B shows laser beam 46 tracking retroreflector target 26. In this case, the distance from tracker 10 to target 26 is measured. The ADM or interferometer readings form a one-dimensional map of distances that can be recorded by tracker 10 as a function of time and analyzed to look for patterns of movement. The combined movements of FIGS. 3A and 3B can also be evaluated by laser tracker 10 to look for a pattern in three-dimensional space.

The variations in angle, distance, or three-dimensional space may all be considered as examples of spatial patterns. Spatial patterns are continually observed during routine laser tracker measurements. Within the possible range of observed patterns, some patterns may have associated laser tracker commands. There is one type of spatial pattern in use today that may be considered a command. This pattern is a movement away from the surface of an object following a measurement. For example, if an operator measures a number of points on an object with an SMR to obtain the outer diameter of the object and then moves the SMR away from the surface of the object, it is clear that an outer diameter was being measured. If an operator moves the SMR away from the surface after measuring an inner diameter, it is clear that the inner diameter was being measured. Similarly, if an operator moves an SMR upward after measuring a plate, it is understood that the upper surface of the plate was being measured. It is important to know which side of an object is measured because it is necessary to remove the offset of the SMR, which is the distance from the center to the outer surface of the SMR. If this action of moving the SMR away from an object is automatically interpreted by software associated with the laser tracker measurement, then the movement of the SMR may be considered to be a command that indicates "subtract the SMR offset away from the direction of movement." Therefore, after including this first command in addition to other commands based on the spatial patterns, as described herein, there is a plurality of commands. In other words, there is a correspondence between a plurality of tracker commands and a plurality of spatial patterns.

With all of the discussions in the present application, it should be understood that the concept of a command for a laser tracker is to be taken within the context of the particular measurement. For example, in the above situation in which a movement of the retroreflector was said to indicate whether the retroreflector target was measuring an inner or outer diameter, this statement would only be accurate in the context of a tracker measuring an object having a circular profile.

FIG. 3C shows laser beam 46 tracking retroreflector target 26. In this case, retroreflector target 26 is held fixed, and tracker 10 measures the three-dimensional coordinates. Certain locations within the measurement volume may be assigned special meanings, as for example when a command tablet, described later, is located at a particular three-dimensional position.

FIG. 3D shows laser beam 46 being blocked from reaching retroreflector target 26. By alternately blocking and unblocking laser beam 46, the pattern of optical power returned to tracker 10 is seen by the tracker measurement systems, including the position detector and the distance meters. The variation in this returned pattern forms a pattern as a function of time that can be recorded by the tracker and analyzed to look for patterns.

A pattern in the optical power returned to the laser tracker is often seen during routine measurements. For example, it is common to block a laser beam from reaching a retroreflector and then to recapture the laser beam with the retroreflector at a later time, possibly after moving the retroreflector to a new distance from the tracker. This action of breaking the laser beam and then recapturing the laser beam may be considered to be a simple type of user command that indicates that the retroreflector is to be recaptured after it is moved to a new position. Therefore, after including this first simple command in addition to other commands based on the temporal variation in optical power, as described herein, there is a plurality of commands. In other words, there is a correspondence between a plurality of tracker commands and a plurality of patterns based on variations in optical power received by a sensor disposed on the laser tracker.

A change in optical power is often seen during routine measurements when the laser beam is blocked from returning to the laser tracker. Such an action may be interpreted as a command that indicates "stop tracking" or "stop measuring." Similarly, a retroreflector may be moved to intercept a laser beam. Such simple actions might be interpreted as commands that indicates "start tracking." These simple commands are not of interest in the present patent application. For this reason, commands discussed herein involve changes in optical power that include at least a decrease in optical power followed by an increase in optical power.

FIG. 3E shows laser beam 46 tracking retroreflector 26 with a six degree-of-freedom (DOF) probe 110. Many types of six-DOF probes are possible, and the six-DOF probe 110 shown in FIG. 3E is merely representative, and not limiting in its design. Tracker 10 is able to find the angle of angular tilt of the probe. For example, the tracker may find and record the roll, pitch, and yaw angles of probe 110 as a function of time. The collection of angles can be analyzed to look for patterns.

Figure 4C:
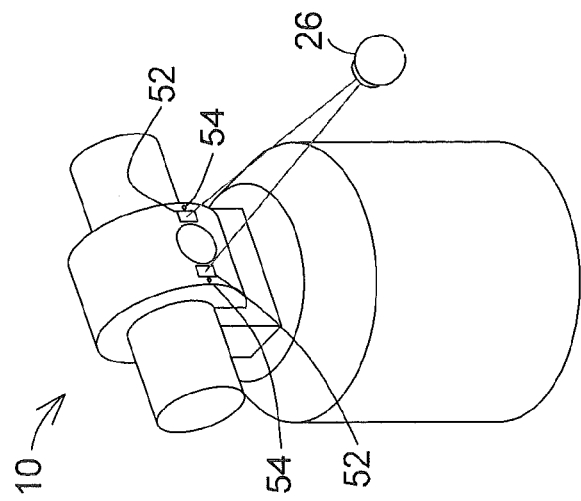
FIGS. 4A-4C illustrate ways in which a passive target can be used to convey gestural information through the camera system of a laser tracker.
Figure 4B:
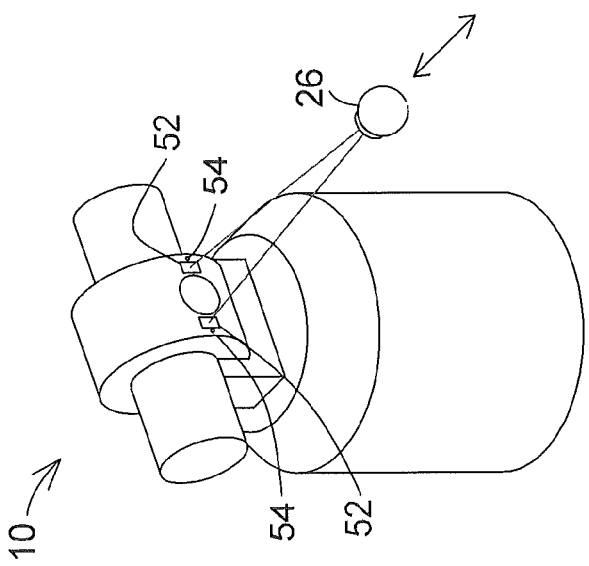
Figure 4A:
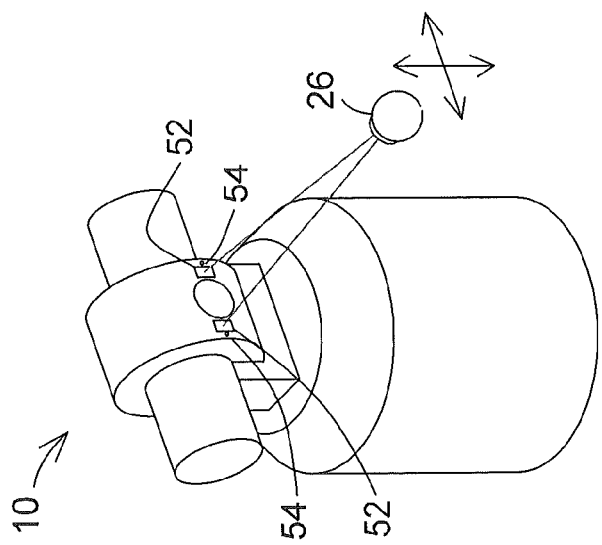

FIGS. 4A-4C demonstrate sensing means by which the operator may communicate gestural patterns that exemplary laser tracker 10 interprets using its camera systems. FIG. 4A shows cameras 52 observing the movement of retroreflector target 26. Cameras 52 record the angular position of target 26 as a function of time. These angles are analyzed later to look for patterns. It is only necessary to have one camera to follow the angular movement of retroreflector target 26, but the second camera enables calculation of the distance to the target. Optional light sources 54 illuminate target 26, thereby making it easier to identify in the midst of background images. In addition, light sources 54 may be pulsed to further simplify target identification.

FIG. 4B shows cameras 52 observing the movement of retroreflector target 26. Cameras 52 record the angular positions of target 26 and, using triangulation, calculate the distance to target 26 as a function of time. These distances are analyzed later to look for patterns. Optional light sources 54 illuminate target 26.

FIG. 4C shows cameras 52 observing the position of retroreflector target 26, which is held fixed. Tracker 10 measures the three-dimensional coordinates of target 26. Certain locations within the measurement volume may be assigned special meanings, as for example when a command tablet, described later, is located at a particular three-dimensional position.

FIGS. 5A-5D demonstrate sensing means by which the operator may communicate gestural patterns that exemplary laser tracker 10 interprets by using its camera systems in combination with an active light source. FIG. 5A shows cameras 52 observing active retroreflector target 120. Active retroreflector target comprises retroreflector target 126 onto which are mounted light source 122 and control button 124 that turns light source 122 on and off. The operator presses control button 124 on and off in a prescribed pattern to illuminate light source 122 in a pattern that is seen by cameras 52 and analyzed by tracker 10.

An alternative mode of operation for FIG. 5A is for the operator to hold down control button 124 only while gesturing a command, which might be given, for example, using side-to-side and up-down movements. By holding down control button 124 only during this time, parsing and analysis is simplified for tracker 10. There are several ways that the tracker can obtain the pattern of movement, whether control button 124 is held down or not: (1) cameras 52 can follow the movement of light source 122; (2) cameras 52 can follow the movement of retroreflector 126, which is optionally illuminated by light sources 54; or (3) tracking and measurement systems of laser tracker 10 can follow the movement of retroreflector 126. In addition, it is possible for the tracker to follow retroreflector 126 in order to collect measurement data while the operator is at the same time pressing control button 124 up and down to produce a temporal pattern in the emitted LED light to issue a command to the tracker.

FIG. 5B shows cameras 52 observing light source 132 on six DOF probe 130. Six-DOF probe 130 comprises retroreflector 136, light source 132, and control button 134. The operator presses control button 134 on and off in a prescribed manner to illuminate light source 132 in a pattern seen by cameras 54 and analyzed by tracker 10.

An alternative mode of operation for FIG. 5B is for the operator to hold down control button 134 only while gesturing a command, which might be given, for example, using side-to-side and up-down movements or rotations. By holding down control button 134 only during this time, parsing and analysis is simplified for tracker 10. In this case, there are several ways that the tracker can obtain the pattern of movement: (1) cameras 52 can follow the movement of light source 132; (2) cameras 52 can follow the movement of retroreflector 136, which is optionally illuminated by light sources 54; or (3) tracking and measurement systems of laser tracker 10 can follow the movement or rotation of six-DOF target 130.

FIGS. 5A, 5B can also be used to indicate a particular position. For example, a point on the spherical surface of the active retroreflector target 120 or a point on the spherical surface of the six-DOF probe 130 can be held against an object to provide a location that can be determined by the cameras 52. Certain locations within the measurement volume may be assigned special meanings, as for example when a command tablet, described in reference to FIG. 12, is located at a particular three-dimensional position.

FIG. 5C shows cameras 52 observing light source 142 on wand 140. Wand 140 comprises light source 142 and control button 144. The operator presses control button 144 on and off in a prescribed manner to illuminate light source 142 in a temporal pattern seen by cameras 54 and analyzed by tracker 10.

FIG. 5D shows cameras 52 observing light source 142 on wand 140. The operator presses control button 144 on wand 140 to continuously illuminate light source 142. As the operator moves wand 140 in any direction, cameras 52 record the motion of wand 140, the pattern of which is analyzed by tracker 10. It is possible to use a single camera 52 if only the pattern of the transverse (side-to-side, up-down) movement and not the radial movement is important.

As explained above, tracker 10 has the ability to detect spatial positions, spatial patterns, and temporal patterns created by the operator through the use of retroreflector target 26, six-DOF target 110 or 130, active retroreflector target 120, or wand 140. These spatial or temporal patterns are collectively referred to as gestures. The particular devices and modes of sensing depicted in FIGS. 3A-3E, 4A-4C, 5A-5D are specific examples and should not be understood to limit the scope of the invention.

Figure 6:
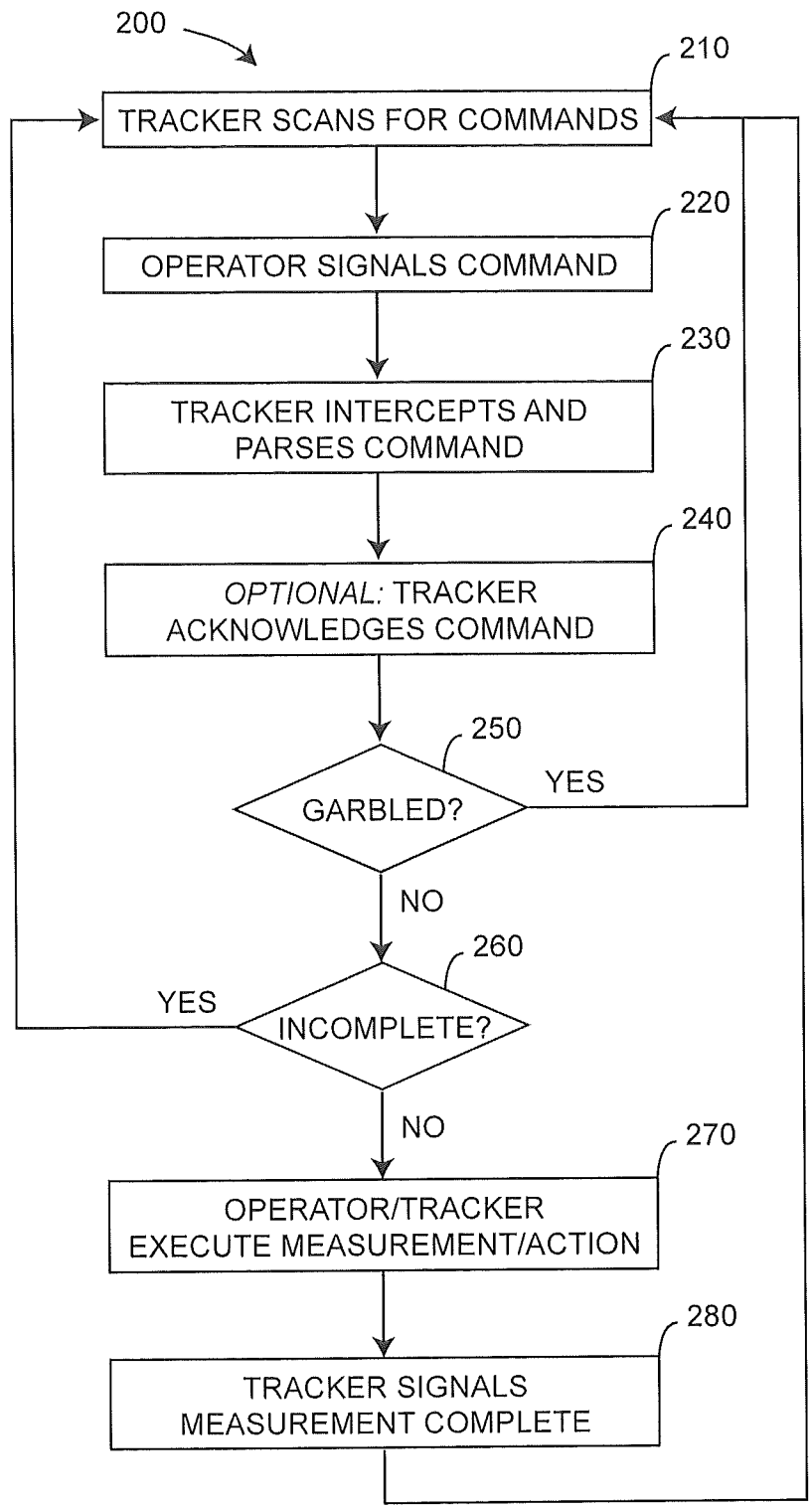
FIG. 6 is a flow chart showing the steps carried out by the operator and laser tracker in issuing and carrying out a gestural command.

FIG. 6 shows flow chart 200, which lists steps carried out by the operator and laser tracker 10 in issuing and carrying out gestural commands. In step 210, laser tracker 10 scans continuously for commands. In other words, the tracker uses one or more of the modes of sensing shown in FIGS. 3A-3E, 4A-4C, 5A-5D to record positions, spatial patterns, and temporal patterns. In step 220, the operator signals a command. This means that the operator creates a gesture by taking a suitable action on an object such as retroreflector target 26, six-DOF target 110 or 130, active retroreflector target 120, or wand 140. An appropriate action might involve movement to a particular absolute coordinate or movement to create a particular spatial or temporal pattern.

In step 230, tracker 10 intercepts and parses the command just signaled by the operator. It intercepts the command by sensing and recording spatial and temporal information from the moving objects. It parses the command by using computing power, possibly within the tracker, to break the stream of data into appropriate subunits and identify the patterns formed by the subunits according to an algorithm. Types of algorithms that might be used are discussed hereinafter.

In step 240, the tracker acknowledges that a command has been received. The acknowledgement might be in the form of a flashing light located on the tracker, for example. The acknowledgement might take several forms depending on whether the command was clearly received, garbled or incomplete, or impossible to carry out for some reason. The signal for each of these different conditions could be given in a variety of different ways. For example, different colors of lights, or different patterns or durations of flashes might be possible. Audible tones could also be used as feedback.

In step 250, tracker 10 checks whether the command is garbled. In other words, is the meaning of the received command unclear? If the command is garbled, the flow returns to step 210, where tracker 10 continues to scan for commands. Otherwise the flow continues to step 260, where tracker 10 checks whether the command is incomplete. In other words, is more information needed to fully define the command? If the command is incomplete, the flow returns to step 210, where tracker 10 continues to scan for commands. Otherwise the flow continues to step 270.

In step 270, tracker 10 executes whatever actions are required by the command. In some cases, the actions require multiple steps both on the part of the tracker and the operator. Examples of such cases are discussed below. In step 280, tracker 10 signals that the measurement is complete. The flow then returns to step 210, where the tracker continues to scan for commands.

Figure 7:
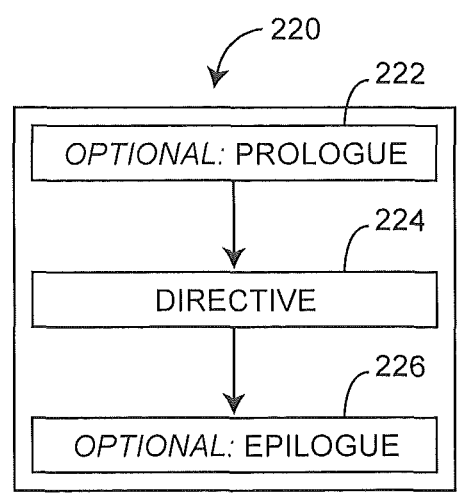
FIG. 7 is a flow chart showing the optional and required parts of a gestural command.

FIG. 7 shows that step 220, in which the operator signals a command, comprises three steps: step 222—prologue, step 224—directive, and step 226—epilogue. The prologue and epilogue steps are optional. The directive part of the command is that part of the command that conveys the instructions to be followed. The prologue part of the command indicates to the tracker that the command is starting and the directive will soon be given. The epilogue part of the command indicates to the tracker that the command is over.

FIGS. 8-10 show two exemplary sets of gestures ("Example 1 gesture" and "Example 2" gesture) that correspond to an exemplary set of commands. The leftmost columns of FIGS. 8-10 show the exemplary set of commands. Some of these commands are taken from FARO CAM2 software. Other commands are taken from other software such as SMX Insight software or the Utilities software shipped with the FARO laser tracker. Besides these examples, commands may be taken from other software or simply created for a particular need. In each of FIGS. 8-10, the second column shows a software shortcut in the CAM2 software, if available. An operator may press this software shortcut on the keyboard to execute the corresponding command. The third and fourth columns of FIGS. 8-10 show some spatial patterns that might be used to represent a certain command. The two dimensional spatial patterns might be sensed using methods shown in FIG. 3A, 4A, or 5D, for example.

For each of the gestures in the third and fourth columns in FIGS. 8-10, the starting position is indicated with a small circle and the ending position is indicated with an arrow. The gestures in the third column of FIGS. 8-10 are simple shapes—circles, triangles, or squares. The 28 shapes shown in this column are distinguished from one another by their orientations and starting positions. In contrast, the shapes in the fourth column of FIGS. 8-10 are suggestive of the command to be carried out. The main advantage of the shapes in the third columns is that these are easier for the computer to recognize and interpret as commands. This aspect is discussed in more detail below. The main advantage of the shapes in the fourth columns is that these may be easier for the operator to remember.

Figures 11A, 11B, 11C, 11D, 11E, 11F:
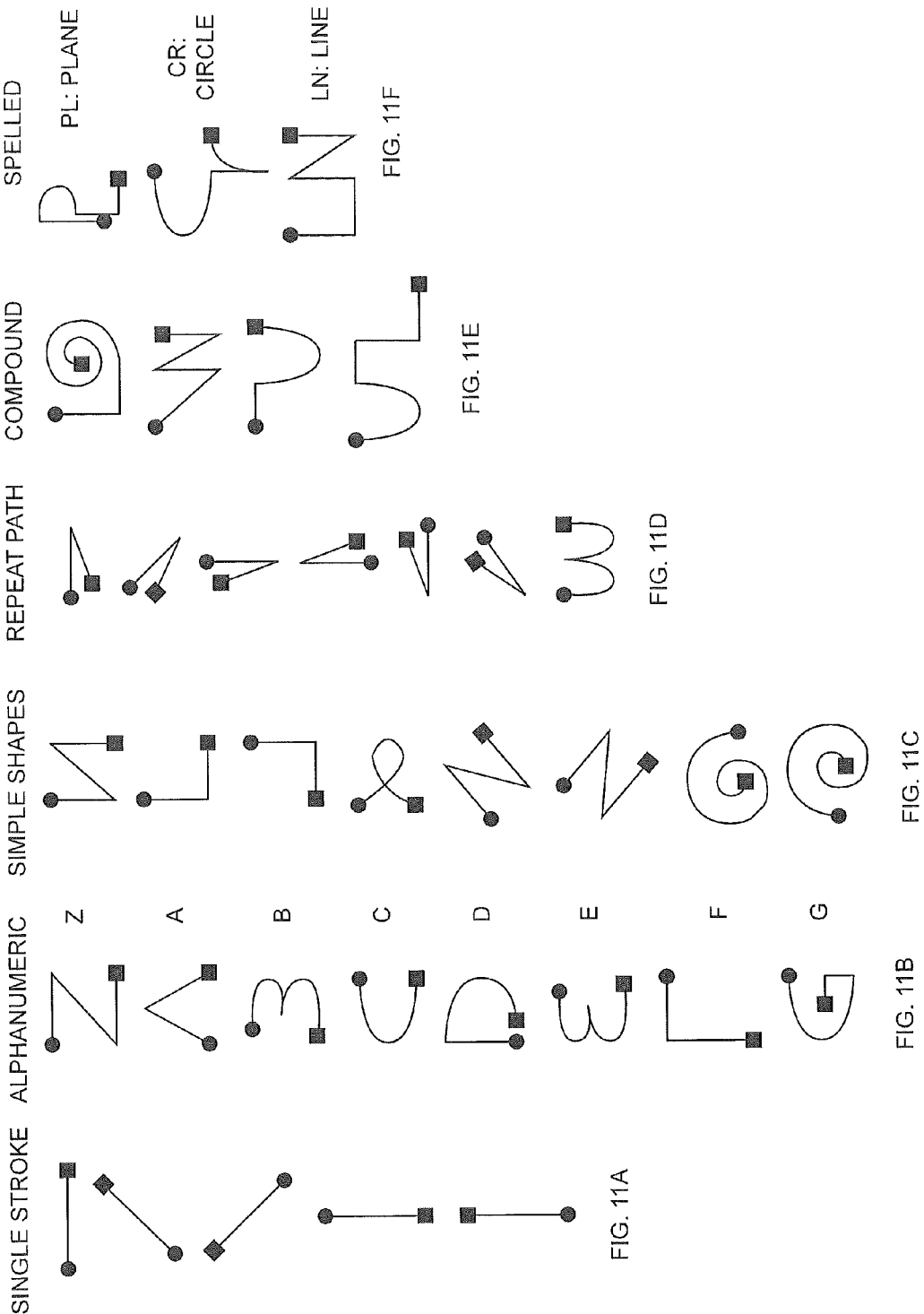
FIGS. 11A-11F show alternative types of gestures that might be used.

FIGS. 11A-11F show some alternative spatial patterns that might be used in gestures. FIG. 11A shows single strokes; FIG. 11B shows alphanumeric characters; FIG. 11C shows simple shapes; FIG. 11D shows a simple path with the path retraced or repeated once; FIG. 11E shows a compound path formed of two or more simpler patterns; and FIG. 11F shows patterns formed of two or more letters.

FIG. 12 shows an exemplary command tablet 300. The operator carries command tablet 300 to a convenient location near the position where the measurement is being made. Command tablet 300 may be made of stiff material having the size of a sheet of notebook paper or larger. The operator places command tablet 300 on a suitable surface and may use a variety of means to hold the target in place. Such means may include tape, magnets, hot glue, tacks, or Velcro. The operator establishes the location of command tablet 300 with the frame of reference of laser tracker 10 by touching fiducial positions 310, 312, and 314 with retroreflector 26. It would be possible to use multiple command tablets in a given environment. An exemplary procedure for finding the command tablet location is discussed below.

Command tablet 300 may be divided into a number of squares. In addition to the squares for fiducial positions 310, 312, and 314, there are squares for commands in FIGS. 8-10, and other squares corresponding to target type, nest type, direction, and number. The layout and contents of exemplary command tablet 300 is merely suggestive, and the command tablet may be effectively designed in a wide variety of ways. A custom command tablet may also be designed for a particular job.

To gesture a command to laser tracker 10, the operator touches the retroreflector to the desired square on command tablet 300. This action by the operator corresponds to step 220 in FIG. 200. Sensing of the action may be carried out by methods shown in FIG. 3C or 4C, for example. If a sequence involving multiple numbers is to be entered—for example, the number 3.50—then the squares 3, point, 5, and 0 would be touched in order. As is discussed below, there are various ways of indicating to the tracker that a square is to be read. One possibility is to wait a preset time—say, for at least two seconds. The tracker will then give a signal, which might be a flashing light, for example, indicating that it has read the contents of the square. When the entire sequence of numbers has been entered, the operator may terminate the sequence in a predetermined way. For example, the agreed upon terminator might be to touch one of the fiducial points.

Command tablet 300 may also be used with an articulated arm CMM instead of a laser tracker. An articulated arm CMM comprises a number of jointed segments attached to a stationary base on one end and a probe, scanner, or sensor on the other end. Exemplary articulated arm CMMs are described in U.S. Pat. No. 6,935,036 to Raab et al., which is incorporated by reference herein, and U.S. Pat. No. 6,965,843 to Raab et al., which is incorporated by reference herein. The probe tip is brought into contact with the squares of command tablet 300 in the same way as the retroreflector target is brought into contact with the squares of command tablet 300 when using a laser tracker. An articulated arm CMM typically makes measurement over a much smaller measurement volume than does a laser tracker. For this reason, it is usually easy to find a convenient place to mount command tablet 300 when using an articulated arm CMM. The particular commands included in command tablet 300 would be adapted to commands appropriate for the articulated arm CMM, which are different than commands for the laser tracker. The advantage of using a command tablet with an articulated arm CMM is that it saves the operator the inconvenience and lost time of setting down the probe, moving to the computer, and entering a command before returning to the articulated arm CMM.

Figure 13:
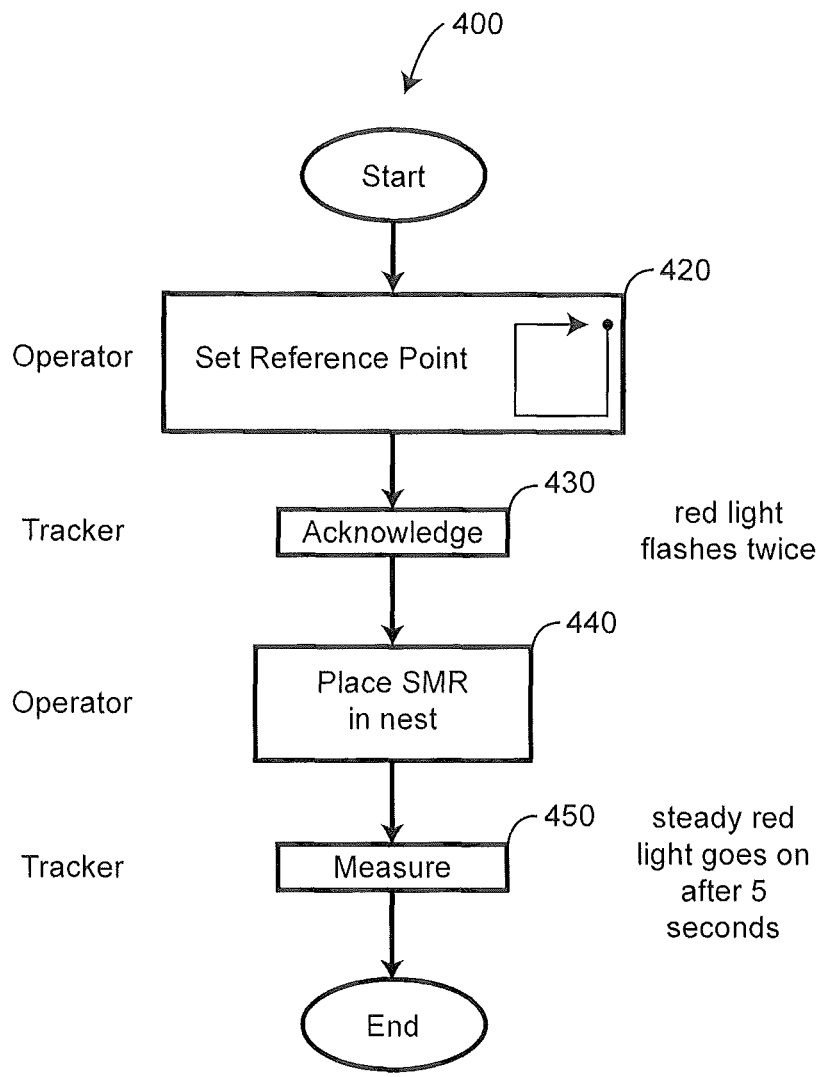
FIG. 13 shows an exemplary method for using gestures to set a tracker reference point.

We now give four examples in FIGS. 13-16 of how gestures may be used. FIG. 13 shows gestures being used to set a reference point for exemplary laser tracker 10. Recall from the earlier discussion that Auto Reset is a possible option mode of a laser tracker. If the laser tracker is set to the Auto Reset option, then whenever the beam path is broken, the laser beam will be directed to the reference position. A popular reference position is the home position of the tracker, which corresponds to the position of a magnetic nest permanently mounted on the body of the laser tracker. Alternatively, a reference point close to the work volume may be chosen to eliminate the need for the operator to walk back to the tracker when the beam is broken. (Usually this capability is most important when the tracker is using an interferometer rather than an ADM to make the measurement.)

In FIG. 13, the actions shown in flow chart 400 are carried out to set a reference point through the use of gestures. In step 420, the operator moves the target in the pattern shown for "Set Reference Point" in FIG. 10. The target in this case may be retroreflector 26, for example, as shown in FIG. 3A. In step 430, laser tracker 10 intercepts and parses the command and acknowledges that the command has been received. In this case, the form of acknowledgement is two flashes of the red light on the tracker front panel. However, other feedback such as a different color or pattern, or an audible tone may be used. In step 440, the operator places SMR 26 into the magnetic nest that defines the reference position. Laser tracker 10 continually monitors position data of SMR 26 and notes when it is stationary. If the SMR is stationary for five seconds, tracker 10 recognizes that the operator has intentionally placed the SMR in the nest, and the tracker begins to measure. A red light on the tracker panel, for example, may be illuminated while the measurement is taking place. The red light goes out when the measurement is completed.

Figure 14:
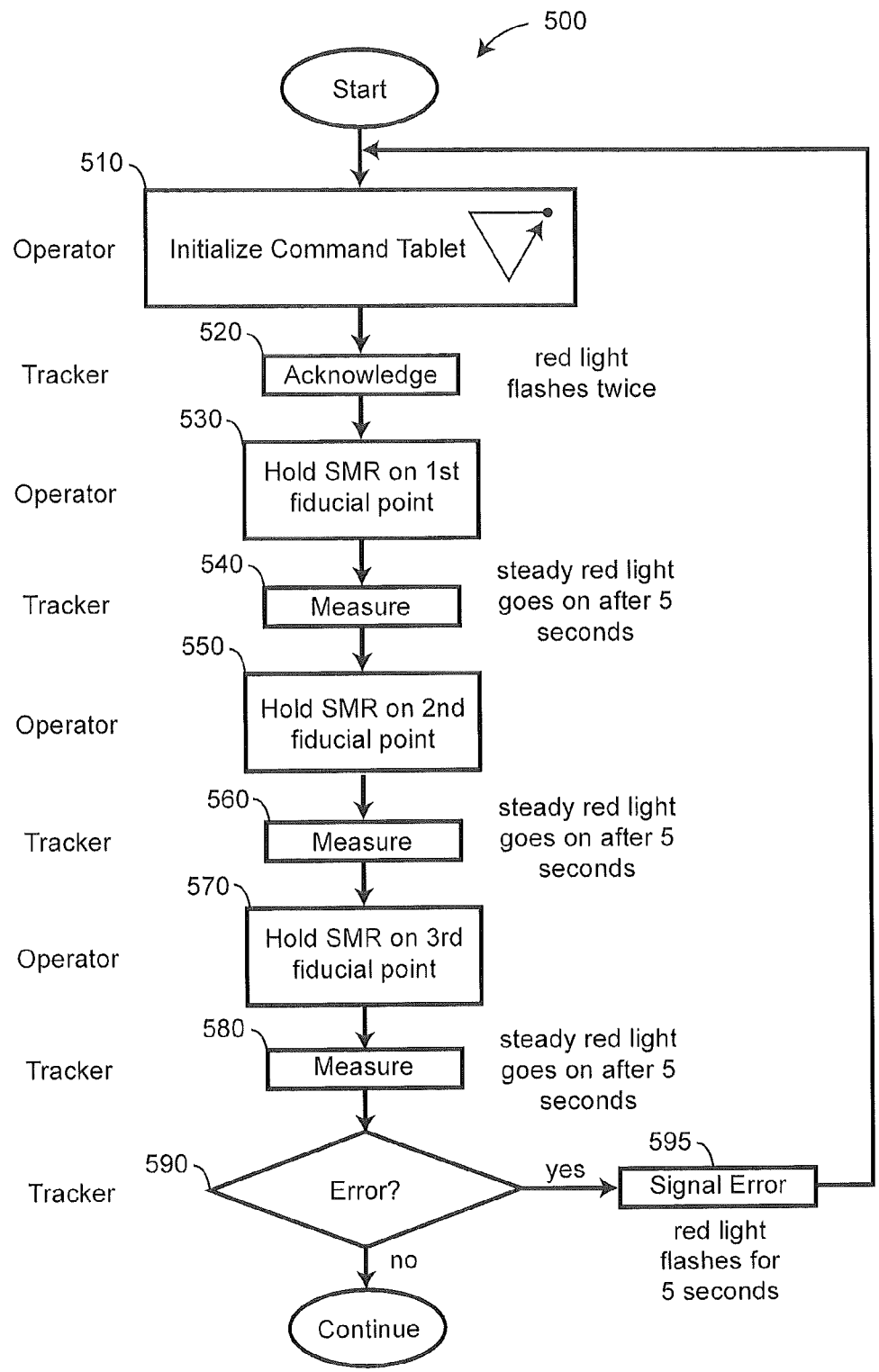
FIG. 14 shows an exemplary method for using gestures to initialize the exemplary command tablet.

In FIG. 14, the actions shown in flow chart 500 are carried out to establish the position of exemplary command tablet 300 in three-dimensional space. Recall from the earlier discussion that command tablet 300 has three fiducial positions 310, 312, and 314. By touching a retroreflector target to these three positions, the position of command tablet 300 in three-dimensional space can be found. In step 510, the operator moves the target in the pattern shown for "Initialize Command Tablet" in FIG. 9. The target in this case may be retroreflector 26, for example, as shown in FIG. 3A. In step 520, laser tracker 10 intercepts and parses the command and acknowledges that the command has been received by flashing the red light twice. In step 530, the operator holds SMR 26 against one of the three fiducial points. Laser tracker 10 continually monitors position data of SMR 26 and notes when the SMR is stationary. In step 540, if SMR 26 is stationary for five seconds, tracker 10 measures the position of SMR 26. In step 550, the operator holds SMR 26 against a second of the three fiducial points. In step 560, if SMR 26 is stationary for five seconds, tracker 10 measures the position of SMR 26. In step 570, the operator holds SMR 26 against the third of the three fiducial points. In step 580, if SMR 26 is stationary for five seconds, tracker 10 measures the position of SMR 26. Now tracker 10 knows the three-dimensional positions of each of the three fiducial points, and it can calculate the distance between these three pairs of points from these three points. In step 590, tracker 10 searches for an error by comparing the known distances between the points to the calculated distances between the points. If the differences are too large, a signal error is indicated in step 590 by a suitable indication, which might be flashing of the red light for five seconds.

Figure 15:
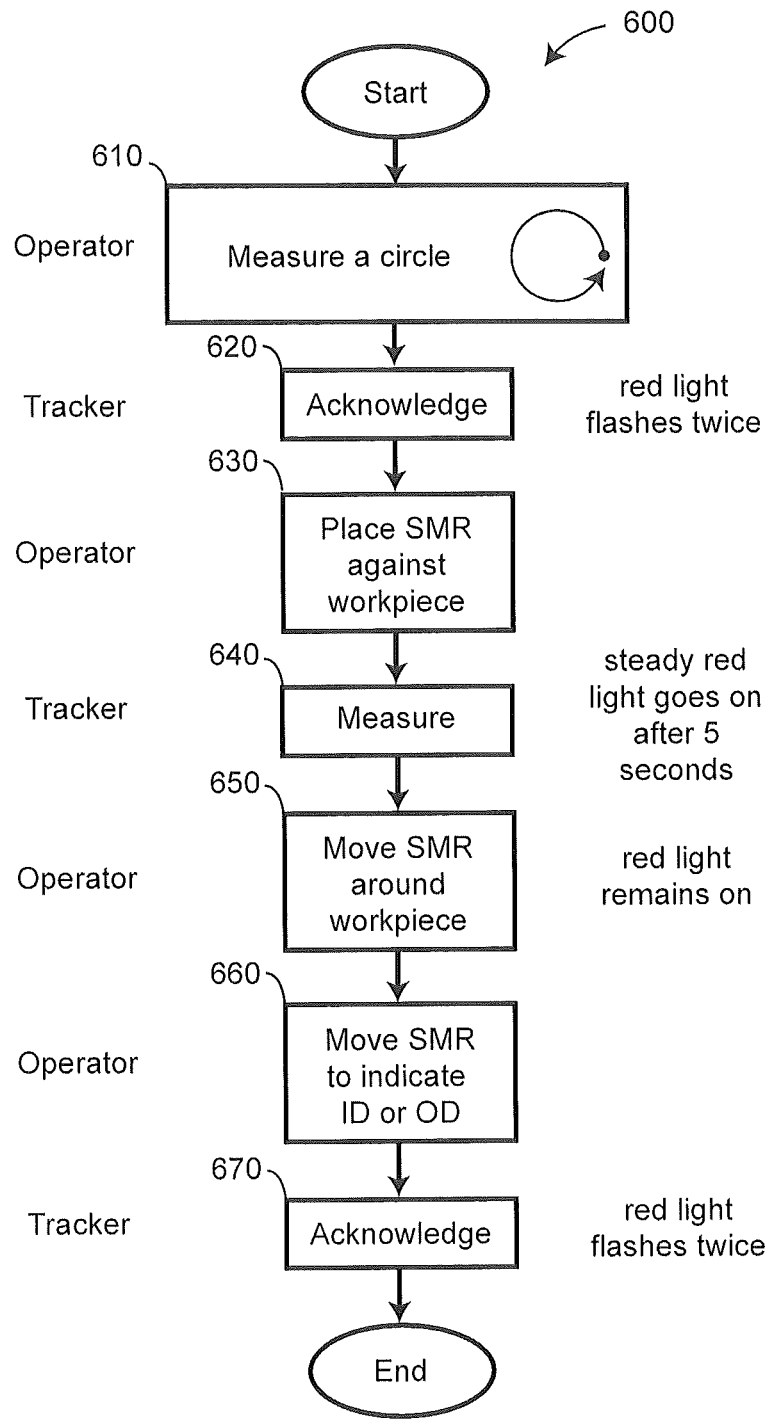
FIG. 15 shows an exemplary method for using gestures to measure a circle.

In FIG. 15, the actions shown in flow chart 600 are carried out to measure a circle through the use of gestures. In step 610, the operator moves the target in the pattern shown for "Measure a Circle" in FIG. 8. The target in this case may be retroreflector 26, for example, as shown in FIG. 3A. In step 620, laser tracker 10 intercepts and parses the command and acknowledges that the command has been received by flashing the red light twice. In step 630, the operator holds retroreflector 26 against the workpiece. For example, if the operator is measuring the inside of a circular hole, he will place the SMR against the part on the inside of the hole. Laser tracker 10 continually monitors position data of retroreflector 26 and notes when the SMR is stationary. In step 640, after retroreflector 26 is stationary for five seconds, the red light comes on and tracker 10 commences continuous measurement of the position of retroreflector 26. In step 650, the operator moves retroreflector 10 along the circle of interest. In step 660, when enough points have been collected, the operator moves retroreflector 26 away from the surface of the object being measured. The movement of retroreflector 26 indicates that the measurement is complete. It also indicates whether retroreflector target 26 is measuring an inner diameter or outer diameter and enables the application software to remove an offset distance to account for the radius of retroreflector 26. In step 670, tracker 10 flashes the red light twice to indicate that the required measurement data has been collected.

Figure 16:
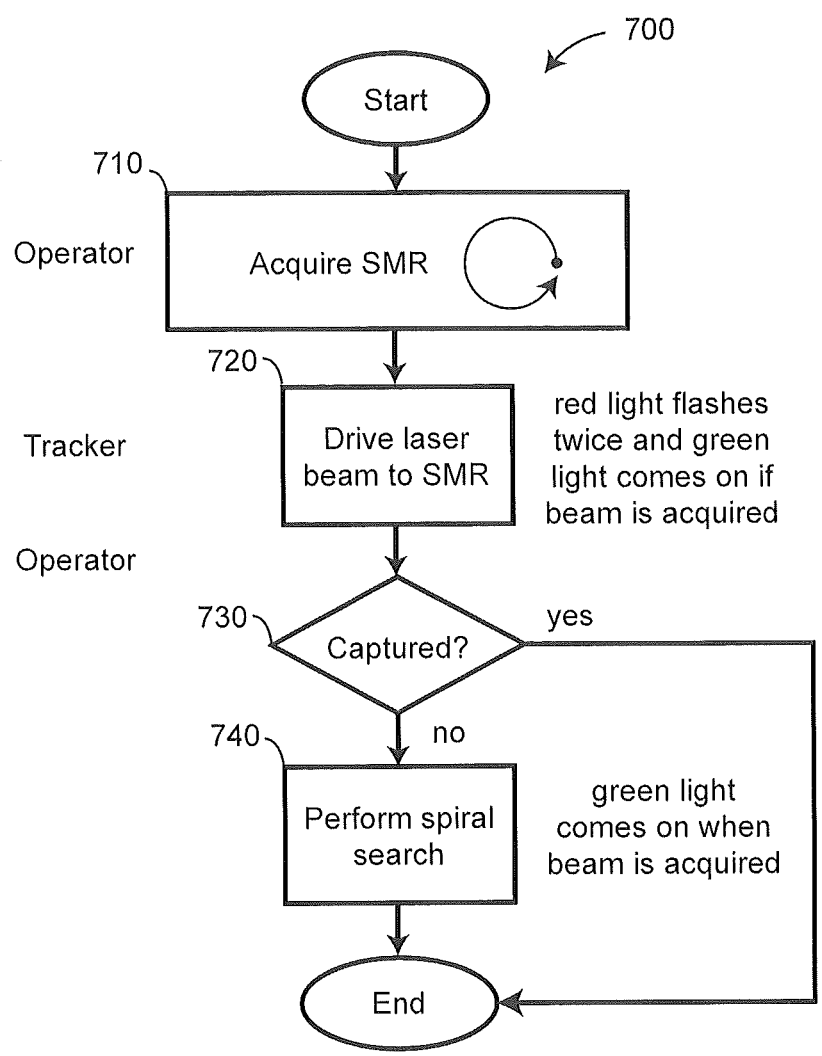
FIG. 16 shows an exemplary method for using gestures to acquire a retroreflector with a laser beam from a laser tracker.

In FIG. 16, the actions shown in flow chart 700 are carried out to acquire a retroreflector after the laser beam from laser tracker 10 has been broken. In step 710, the operator moves the retroreflector in the pattern shown for "Acquire SMR" in FIG. 10. The target in this case may be retroreflector 26, for example, as shown in FIG. 4A. At the beginning of this procedure, the SMR has not acquired the SMR and hence the modes shown in FIGS. 3A-3E cannot be used. Instead cameras 52 and light sources 54 are used to locate retroreflector 26. In step 720, laser tracker 10 intercepts and parses the command and acknowledges that the command has been received by flashing the red light twice. At the same time, it drives the laser beam 46 toward the center of retroreflector 26. In step 730, tracker 10 checks whether the laser beam has been captured by retroreflector 26. In most cases, the laser beam is driven close enough to the center of retroreflector 26 that it lands within the active area of the position detector within the tracker. In this case, the tracker servo system drives the laser beam in a direction that moves the laser beam toward the center of the position detector, which also causes the laser beam to move to the center of retroreflector 26. Normal tracking occurs thereafter. If the laser beam is not driven close enough to the center of retroreflector 26 to land on the position detector within the tracker, then one possibility is to perform a spiral search, as shown in step 740. Laser tracker 10 carries out a spiral search by aiming the laser beam in a starting direction and then directing the beam in an ever widening spiral. Whether or not to perform a spiral search can be set as an option with the laser tracker or the application software used with the laser tracker. Another option, which might be appropriate for a rapidly moving target, is to repeat step 720 repeatedly until the laser beam is captured by the retroreflector or until there is a timeout.

As discussed previously with reference to FIG. 7, the operator signals a command through the use of three steps: an optional prologue, a directive, and an optional epilogue. If tracker 10 is constantly parsing data and can quickly respond when the desired pattern has been produced, then it may be possible to use the directive alone without the prologue or epilogue. Similarly, if the operator touches a position on command tablet 300, the command should be clear to the tracker without the need for a prologue or epilogue. On the other hand, if the tracker cannot parse quickly enough to respond immediately to the patterns created by the operator, or if there is a chance that the operator might create a command pattern unintentionally, then use of a prologue, epilogue, or both may be needed.

An example of a simple prologue or epilogue is simply a pause in the movement of the target, which might be any of the targets shown in FIGS. 3A-3E, 4A-4C, and 5A-5D. For example, the operator may pause for one or two seconds before the start of a pattern and one or two seconds at the end of the pattern. By pausing in this way, the starting and ending positions of each gesture, indicated by circles and arrows, respectively, in FIGS. 8-10 and by circles and squares, respectively, in FIG. 11 will be more easily understood by the parsing software within the tracker or computer.

Another example of a simple prologue or epilogue is rapid blocking and unblocking of the laser beam from the tracker. For example, the operator may splay his fingers so that there is a space between each of the four digits. Then by moving his fingers rapidly across the laser beam, the beam will be broken and unbroken four times in rapid succession. Such a temporal pattern, which might be referred to as the "four finger salute", is readily recognized by the laser tracker. The modes of sensing based on temporal variations in returned laser power are shown in FIG. 3D with a passive target and in FIGS. 5A-5C with active targets.

Besides the use of a prologue or epilogue in the gestural command, a type of prologue is also sometimes needed at the start of an action by the laser tracker. For example, in the examples of FIGS. 13-15, there is a wait of five seconds after a command is given before the tracker measurement is made. The purpose of this wait is to give the operator time to get the retroreflector target into position before beginning the measurement. Of course, the time of five seconds is arbitrary and could be set to any desired value. In addition, it would be possible to use other indicators that the measurement should begin. For example, it would be possible to use a four-finger salute rather than a time delay to indicate readiness for measurement.

Active targets such as those shown in FIGS. 5A-D are useful in applications such as tool building and device assembly. A tool is a type of apparatus made to assist in the manufacture of other devices. In fields such as automotive and aerospace manufacturing, tools are constructed to exacting specifications. The laser tracker helps both in assembling and in checking such tools. In many cases, it is necessary to align the component elements of a tool with respect to one another. A single retroreflector target, such as retroreflector 26, can be used to establish a coordinate system to which each element in the tool can be properly aligned. In a complicated tool, however, this can involve a lot of iterative measuring. An alternative is to mount multiple retroreflector targets on the tooling elements and then measure all of these in rapid succession. Such rapid measurement is made possible today by modern tracker technologies such as absolute distance meters and camera systems (such as components 42, 44). If multiple retroreflectors are mounted directly on tooling, then it may be difficult or inefficient for an operator to use one of these retroreflectors to create gestural commands. It may be more convenient to use a wand such as 140 shown in FIG. 5C or 5D. The operator can quickly give commands using a wand without disturbing the retroreflectors mounted on the tooling. Such a wand may be mounted on the end of a hammer or similar device to leave the operator's hands free to perform assembly and adjustment. In some cases, a separate retroreflector or six-DOF probe, like those shown in FIGS. 5A and 5B, respectively, may be needed during tool building. By adding a light source and control button to the basic SMR or six-DOF probe, the operator can issue commands in a very flexible way.

Active targets such as those shown in FIGS. 5A-D are also useful in device assembly. A modern trend is flexible assembly using laser trackers rather than automated tooling assembly. An important advantage of the tracker approach is that little advance preparation is required. One thing that makes such assembly practical today is the availability of software that matches CAD software drawings to measurements made by laser trackers. By placing retroreflectors on the parts to be assembled and then sequentially measuring the retroreflectors with a laser tracker, the closeness of assembly can be shown on a computer display using colors such as red to indicate "far away", yellow to indicate "getting closer", and green to indicate "close enough". Using an active target, the operator can give commands to measure selected targets or groups of targets in ways to optimize the assembly process.

Multiple retroreflectors are often located in a single measurement volume. Examples for tool building and device assembly with multiple retroreflectors were described above. These examples showed that an active target can be particularly useful. In other cases, the ability of the laser tracker to recognize movements of multiple passive retroreflectors can be useful. For example, suppose that multiple retroreflectors have been placed on a tooling fixture such as a sheet metal stamping press and the operator wants to perform a target survey after each operation of the fixture. The survey will sequentially measure the coordinates of each target to check the repeatability of the tooling fixture. An easy way for the operator to set up the initial survey coordinates is to sequentially lift each retroreflector out of its nest and move it around according to a prescribed gestural pattern. When the tracker recognizes the pattern, it measures the coordinates of the retroreflector in its nest. It is the ability of the tracker cameras to recognize gestural patterns over a wide field of view that enables the operator to conveniently switch among retroreflectors.

As mentioned previously, there are several different types of methods or algorithms that can be used to identify gestural patterns and interpret these as commands. Here we suggest a few methods, while recognizing that a wide variety of methods or algorithms could be used and would work equally well. As explained earlier, there are three main types of patterns of interest: (1) single-point absolute position, (2) temporal patterns, and (3) movement patterns. Recognizing single-point absolute position is arguably the easiest of these three categories. In this case, the tracker simply needs to compare measured coordinates to see whether these agree to within a specified tolerance to a coordinate on the surface of command tablet 300.

Temporal patterns are also relatively easy to identify. A particular pattern might consist of a certain number of on-off repetitions, for example, and additional constraints may be placed on the allowable on and off times. In this case, tracker 10 simply needs to record the on and off times and periodically check whether there is a match with a pre-established pattern. It would of course be possible to reduce the power level rather than completely extinguishing the light to send a signal to the tracker. Reduction in the level of retroreflected laser power could be obtained by many means such as using a neutral density filter, polarizer, or iris.

Movement patterns may be parsed in one, two, or three dimensions. A change in radial distance is an example of a one-dimensional movement. A change in transverse (up-down, side-to-side) movement is an example of two-dimensional measurement. A change in radial and transverse dimensions is an example of three-dimensional measurement. Of course, the dimensions of interest are those currently monitored by the laser tracker system. One way to help simplify the parsing and recognition task is to require that it occur within certain bounds of time and space. For example, the pattern may be required to be between 200 mm and 800 mm (eight inches and 32 inches) in extent and to be completed in between one and three seconds. In the case of transverse movements, the tracker will note the movements as changes in angles, and these angles in radians must be multiplied by the distance to the target to get the size of the pattern. By restricting the allowable patterns to certain bounds of time and space, many movements can be eliminated from further consideration as gestural commands. Those that remain may be evaluated in many different ways. For example, data may be temporarily stored in a buffer that is evaluated periodically to see whether a potential match exists to any of the recognized gestural patterns. A special case of a gestural movement pattern that is particularly easy to identify is when the command button 124 in FIG. 5A is pushed to illuminate light 122 to indicate that a gesture is taking place. The computer then simply needs to record the pattern that has taken place when light 122 was illuminated and then evaluate that pattern to see whether a valid gesture has been generated. A similar approach can be taken when the operator presses command button 134 to illuminate light 132 in FIG. 5B or presses command button 144 to illuminate light 142 in FIG. 5D.

Besides these three main patterns, it is also possible to create patterns made using a passive object or a passive object in combination with a retroreflector. For example, the cameras on the tracker might recognize that a particular command is given whenever a passive red square of a certain size is brought within one inch of the SMR.

It would also be possible to combine two of the three main patterns. For example, it would be possible to combine both the speed of movement with a particular spatial pattern, thereby combining pattern types two and three. As another example, the operator may signal a particular command with a saw tooth pattern comprising a rapid movement up, followed by a slow return. Similarly acceleration might be used. For example, a flick motion might be used to "toss" a laser beam away in a particular direction around an object.

Variations are also possible within types of patterns. For example, within the category of spatial patterns, it would be possible to distinguish between small squares (say, three-inches on a side) and large squares (say, 24 inches on a side).

Figure 17:
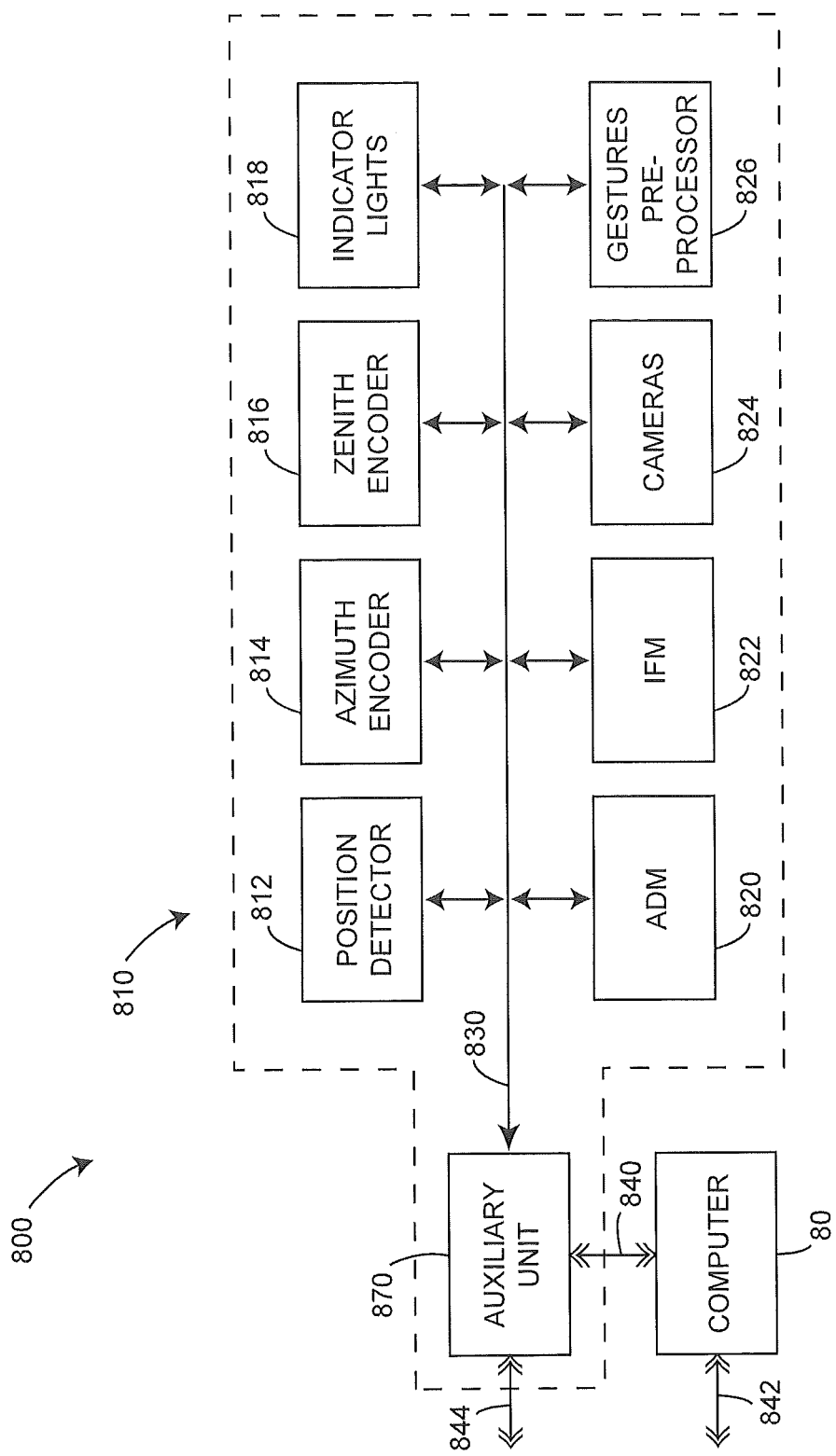
FIG. 17 shows an exemplary electronics and processing system associated with a laser tracker.

The methods of algorithms discussed above are implemented by means of processing system 800 shown in FIG. 17. Processing system 800 comprises tracker processing unit 810 and optionally computer 80. Processing unit 810 includes at least one processor, which may be a microprocessor, digital signal processor (DSP), field programmable gate array (FPGA), or similar device. Processing capability is provided to process information and issue commands to internal tracker processors. Such processors may include position detector processor 812, azimuth encoder processor 814, zenith encoder processor 816, indicator lights processor 818, ADM processor 820, interferometer (IFM) processor 822, and camera processor 824. It may include gestures preprocessor 826 to assist in evaluating or parsing of gestures patterns. Auxiliary unit processor 870 optionally provides timing and microprocessor support for other processors within tracker processor unit 810. It may communicate with other processors by means of device bus 830, which may transfer information throughout the tracker by means of data packets, as is well known in the art. Computing capability may be distributed throughout tracker processing unit 810, with DSPs and FPGAs performing intermediate calculations on data collected by tracker sensors. The results of these intermediate calculations are returned to auxiliary unit processor 870. As explained previously, auxiliary unit 70 may be attached to the main body of laser tracker 10 through a long cable, or it may be pulled within the main body of the laser tracker so that the tracker attaches directly (and optionally) to computer 80. Auxiliary unit 870 may be connected to computer 80 by connection 840, which may be an Ethernet cable or wireless connection, for example. Auxiliary unit 870 and computer 80 may be connected to the network through connections 842, 844, which may be Ethernet cables or wireless connections, for example.

Preprocessing of sensor data may be evaluated for gestures content by any of processors 812-824, but there may also be a processor 826 specifically designated to carry out gestures preprocessing. Gestures preprocessor 826 may be a microprocessor, DSP, FPGA, or similar device. It may contain a buffer that stores data to be evaluated for gestures content. Preprocessed data may be sent to auxiliary unit for final evaluation, or final evaluation of gestures content may be carried out by gestures preprocessor 826. Alternatively, raw or preprocessed data may be sent to computer 80 for analysis.

Although the use of gestures described above has mostly concentrated on their use with a single laser tracker, it is also beneficial to use gestures with collections of laser trackers or with laser trackers combined with other instruments. One possibility is to designate one laser tracker as the master that then sends commands to other instruments. For example, a set of four laser trackers might be used in a multilateration measurement in which three-dimensional coordinates are calculated using only the distances measured by each tracker. Commands could be given to a single tracker, which would relay commands to the other trackers. Another possibility is to allow multiple instruments to respond to gestures. For example, suppose that a laser tracker were used to relocate an articulated arm CMM. An example of such a system is given in U.S. Pat. No. 7,804,602 to Raab, which is incorporated by reference herein. In this case, the laser tracker might be designated as the master in the relocation procedure. The operator would give gestural commands to the tracker, which would in turn send appropriate commands to the articulated arm CMM. After the relocation procedure was completed, the operator could use a command tablet to give gestural commands to the articulated arm CMM, as described above.

Figure 19:
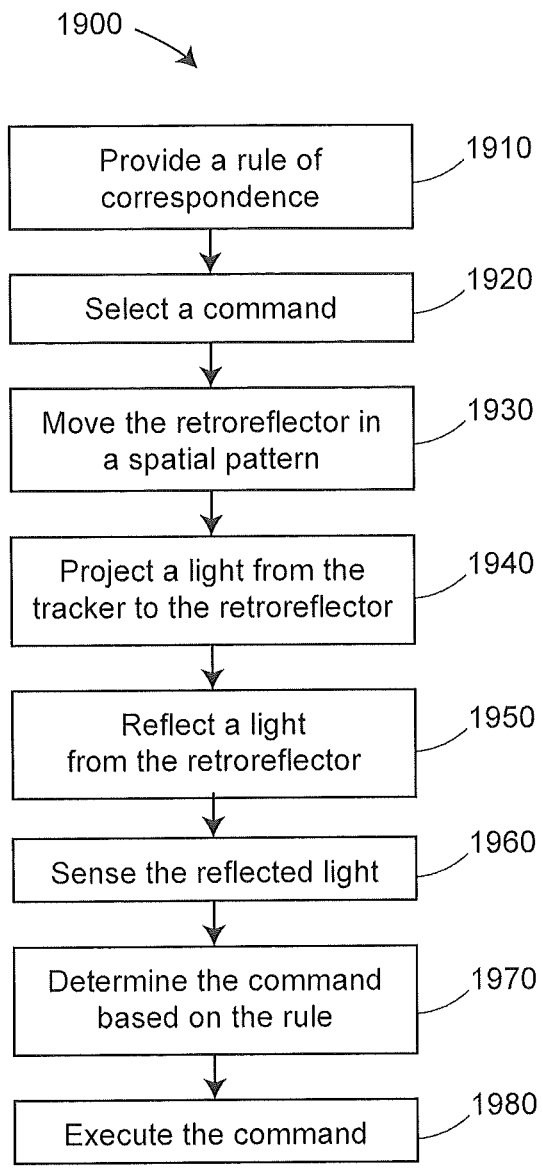
FIG. 19 shows an exemplary method for communicating a command to a laser tracker by gesturing with a retroreflector in a spatial pattern.

FIG. 19 shows steps 1900 that are carried out in giving a gesture to communicate a command to the laser tracker according to the discussions that referenced FIGS. 3A-B, 4A-B, and 5A. Step 1910 is to provide a rule of correspondence between commands and spatial patterns. Step 1920 is for the user to select a command from among the possible commands. Step 1930 is for the user to move the retroreflector in a spatial pattern corresponding to the desired command. The spatial pattern might be in transverse or radial directions. Step 1940 is to project a light from the laser tracker to the retroreflector. This light may be a beam of light emitted along the optical axis of the laser tracker or it may be light emitted by an LED near a camera disposed on the laser tracker. Step 1950 is to reflect light from the retroreflector back to the laser tracker. Step 1960 is to sense the reflected light. The sensing may be done by a photosensitive array within a camera disposed on the tracker; by a position detector in the tracker, or by a distance meter within the tracker. Step 1970 is to determine the command based on the rule of correspondence. Step 1980 is to execute the command.

Figure 20:
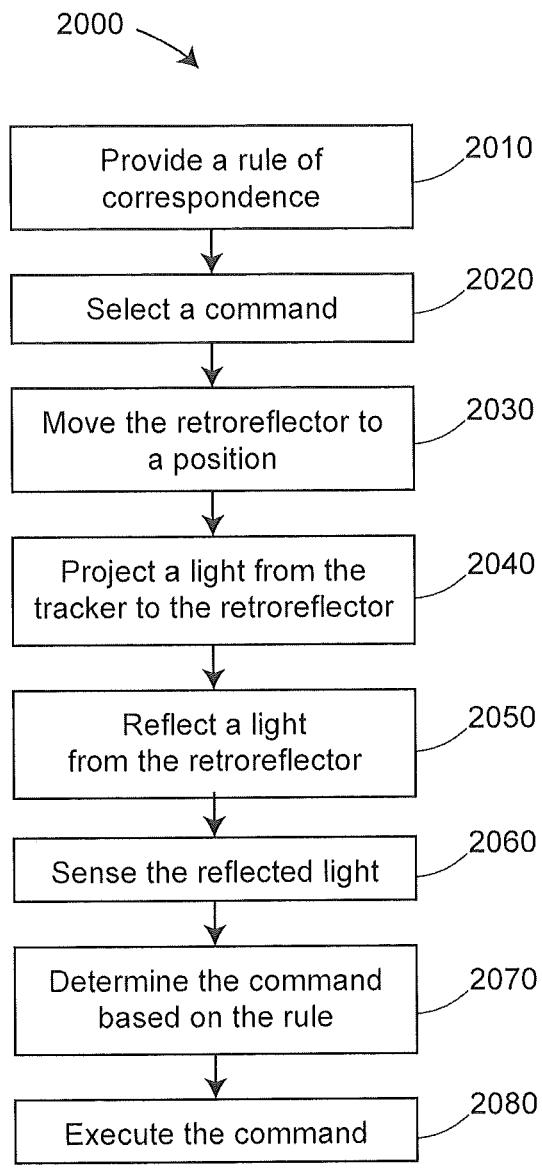
FIG. 20 shows an exemplary method for communicating a command to a laser tracker by indicating a position with a retroreflector.

FIG. 20 shows steps 2000 that are carried out in giving a gesture to communicate a command to the laser tracker according to the discussions that referenced FIGS. 3C, 4C, and 5A. Step 2010 is to provide a rule of correspondence between commands and three-dimensional positions. Step 2020 is for the user to select a command from among the possible commands. Step 2030 is for the user to move the retroreflector to a position corresponding to the desired command, possibly by bringing the retroreflector target in contact with a command tablet. Step 2040 is to project a light from the laser tracker to the retroreflector. This light may be a beam of light emitted along the optical axis of the laser tracker or it may be light emitted by an LED near a camera disposed on the laser tracker. Step 2050 is to reflect light from the retroreflector back to the laser tracker. Step 2060 is to sense the reflected light. The sensing may be done by a photosensitive array within a camera disposed on the tracker; by a position detector in the tracker, or by a distance meter within the tracker. Step 2070 is to determine the command based on the rule of correspondence. Step 2080 is to execute the command.

Figure 21:
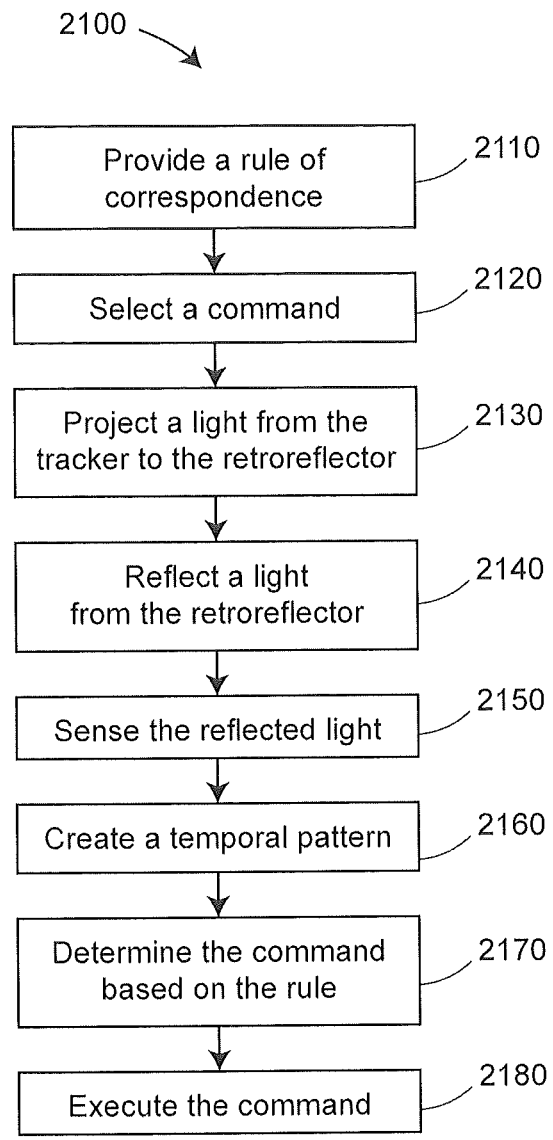
FIG. 21 shows an exemplary method for communicating a command to a laser tracker by gesturing with a retroreflector in a temporal pattern.

FIG. 21 shows steps 2100 that are carried out in giving a gesture to communicate a command to the laser tracker according to the discussions that referenced FIGS. 3D and 5A. Step 2110 is to provide a rule of correspondence between commands and temporal patterns. Step 2120 is for the user to select a command from among the possible commands. Step 2130 is to project a light from the laser tracker to the retroreflector. This light may be a beam of light emitted along the optical axis of the laser tracker or it may be light emitted by an LED near a camera disposed on the laser tracker. Step 2140 is to reflect light from the retroreflector back to the laser tracker. Step 2150 is to sense the reflected light. The sensing may be done by a photosensitive array within a camera disposed on the tracker; by a position detector in the tracker, or by a distance meter within the tracker. Step 2160 is for the user to create a temporal pattern in the optical power received by the sensors on the laser tracker. Such a temporal pattern is easily done by blocking and unblocking a beam of light as discussed hereinbelow. Step 2170 is to determine the command based on the rule of correspondence. Step 2180 is to execute the command.

Figure 22:
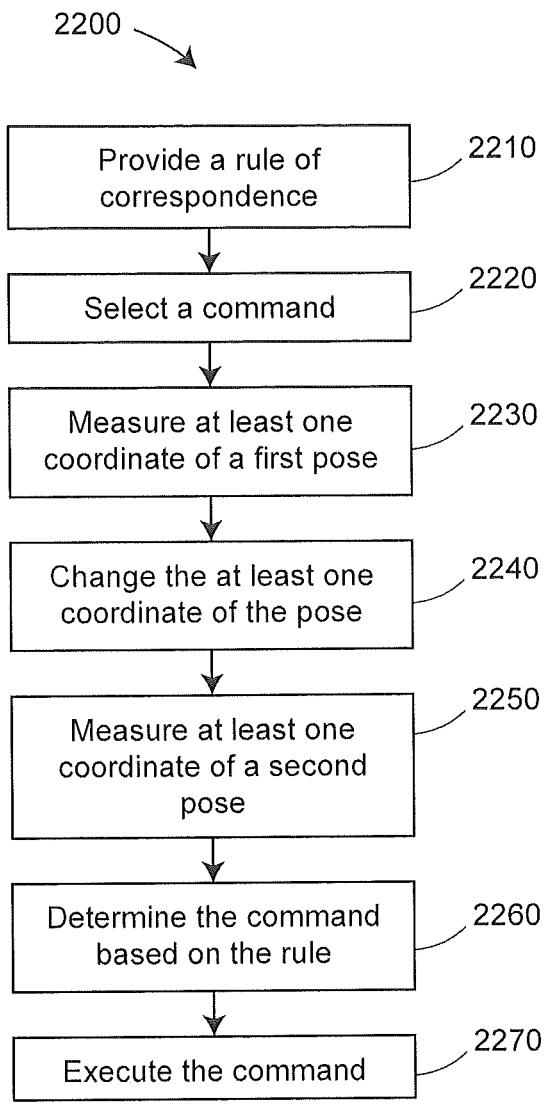
FIG. 22 shows an exemplary method for communicating a command to a laser tracker by measuring a change in the pose of a six DOF target with a six DOF laser tracker.

FIG. 22 shows steps 2200 that are carried out in giving a gesture to communicate a command to a six DOF laser tracker according to the discussions that referenced FIGS. 3E and 5B. Step 2210 is to provide a rule of correspondence between commands and pose of a six DOF target. Step 2220 is for the user to select a command from among the possible commands. Step 2230 is to use the six DOF laser tracker to measure at least one coordinate of a six DOF target in a first pose. A pose includes three translational coordinates (e.g., x, y, z) and three orientational coordinates (e.g., roll, pitch, yaw). Step 2240 is for the user to change at least one of the six dimensions of the pose of the six DOF target. Step 2250 is to measure the at least one coordinate of a second pose, which is the pose that results after the user has completed step 2240. Step 2260 is to determine the command based on the rule of correspondence. Step 2270 is to execute the command.

Figure 23:
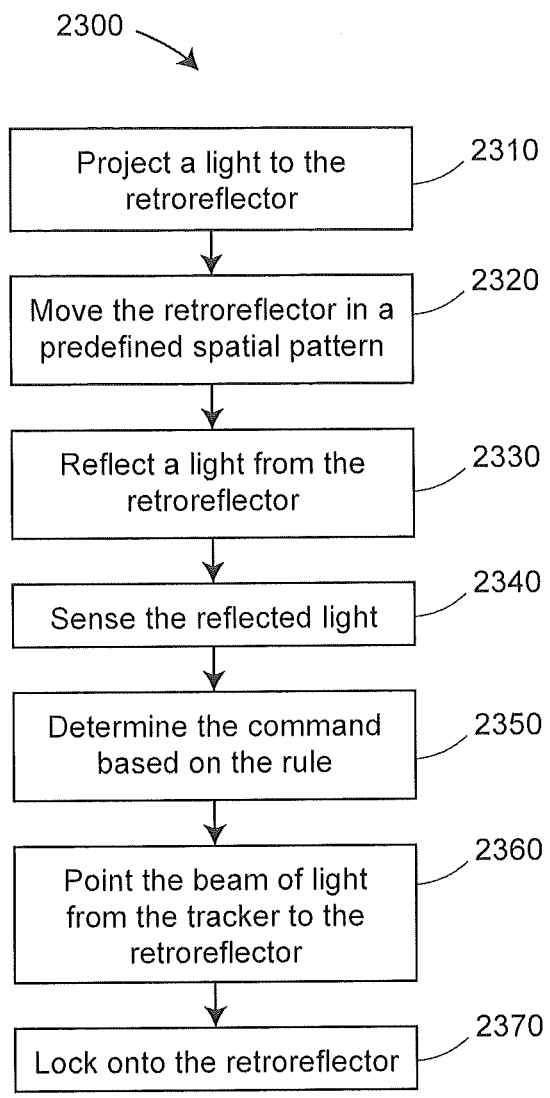
FIG. 23 shows an exemplary method for communicating a command to point the laser beam from the laser tracker to a retroreflector and lock onto the retroreflector, the communication based on a gesture involving a spatial pattern created with the retroreflector.

FIG. 23 shows steps 2300 that are carried out in giving a gesture to communicate a command to the laser tracker to point the laser beam from the laser tracker to the target and lock onto the target. Step 2310 is to project light onto the retroreflector. This light may be light emitted by an LED near a camera disposed on the laser tracker. Step 2320 is for the user to move the retroreflector in a predefined spatial pattern. Step 2330 is to reflect light from the retroreflector to the laser tracker. Step 2340 is to sense the reflected light. The sensing may be done, for example, by a photosensitive array within a camera disposed on the tracker. Step 2350 is to determine the command based on the rule of correspondence. Step 2360 is to point the beam of light from the tracker to the retroreflector. Step 2370 is to lock onto the retroreflector with the laser beam from the tracker.

Figure 24:
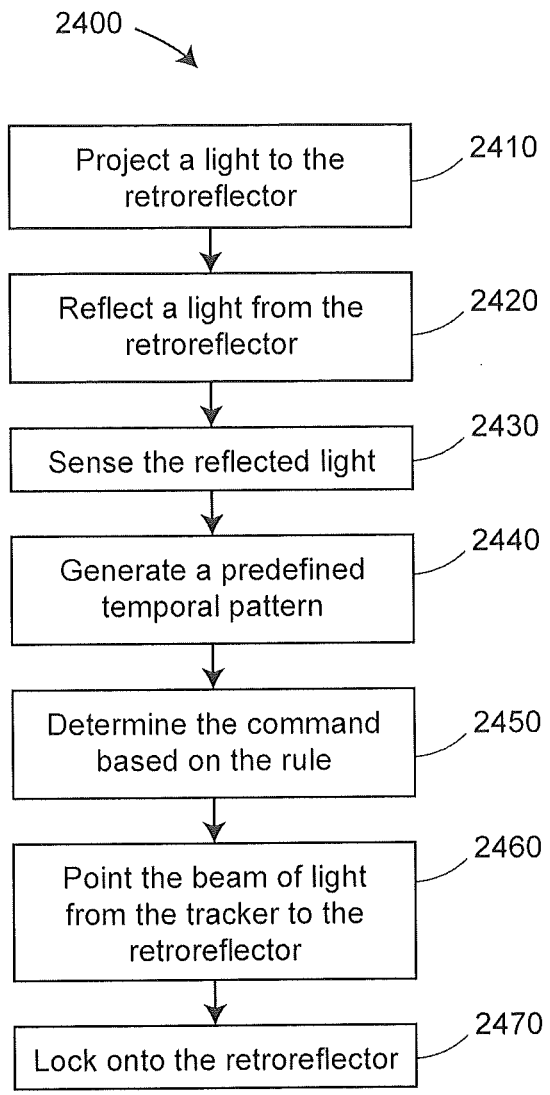
FIG. 24 shows an exemplary method for communicating a command to point the laser beam from the laser tracker to a retroreflector and lock onto the retroreflector, the communication based on a gesture involving a temporal pattern in the optical power received by the laser tracker.

FIG. 24 shows steps 2400 that are carried out in giving a gesture to communicate a command to the laser tracker to point the laser beam from the laser tracker to the target and lock onto the target. Step 2410 is to project light onto the retroreflector. This light may be light emitted by an LED near a camera disposed on the laser tracker. Step 2420 is to reflect light from the retroreflector to the laser tracker. Step 2430 is to sense the reflected light. The sensing may be done, for example, by a photosensitive array within a camera disposed on the tracker. Step 2440 is to generate a predefined temporal pattern, as discussed hereinabove. Step 2450 is to determine the command based on the rule of correspondence. Step 2460 is to point the beam of light from the tracker to the retroreflector. Step 2470 is to lock onto the retroreflector with the laser beam from the tracker.

Figure 25:
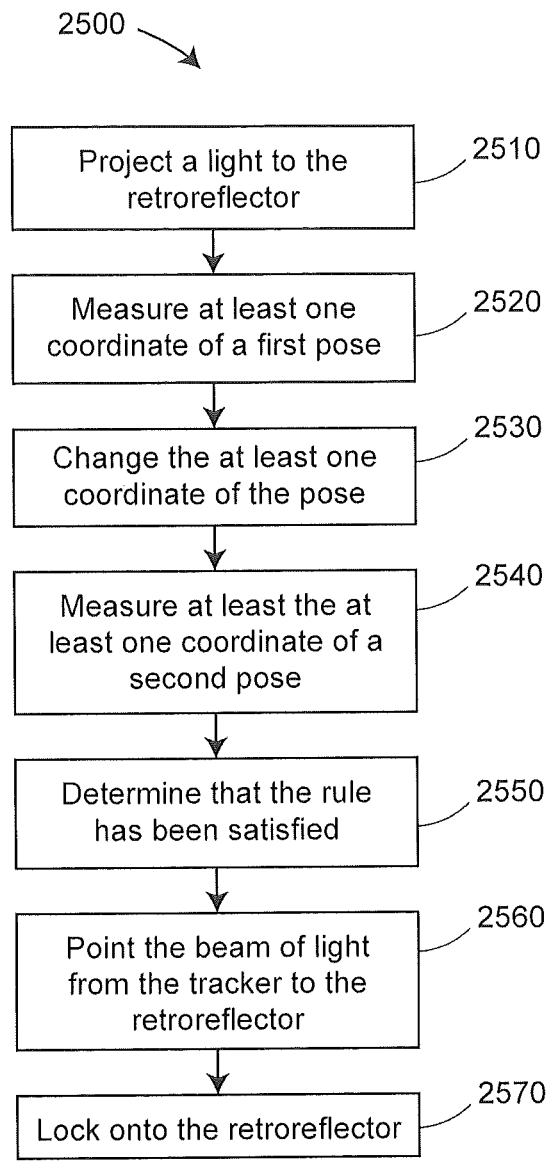
FIG. 25 shows an exemplary method for communicating a command to point the laser beam from the laser tracker to a retroreflector and lock onto the retroreflector, the communication based on a gesture involving a change in the pose of a six DOF probe.

FIG. 25 shows steps 2500 that are carried out in giving a gesture to communicate a command to the laser tracker to point the laser beam from the laser tracker to the target and lock onto the target. Step 2510 is to project light onto the retroreflector. This light may be light emitted by an LED near a camera disposed on the laser tracker. Step 2520 is to measure at least one coordinate of a first pose of a six DOF target. As discussed hereinabove, the pose includes three translational and three orientational degrees of freedom. Step 2530 is to change at least one coordinate of a first pose. Step 2540 is to measure the at least one coordinate of a second pose, which is the pose that results after the at least one coordinate of the six DOF probe has been changed. Step 2550 is to determine the rule of correspondence has been satisfied. Step 2560 is to point the beam of light from the tracker to the retroreflector. Step 2570 is to lock onto the retroreflector with the laser beam from the tracker.

Figure 26:
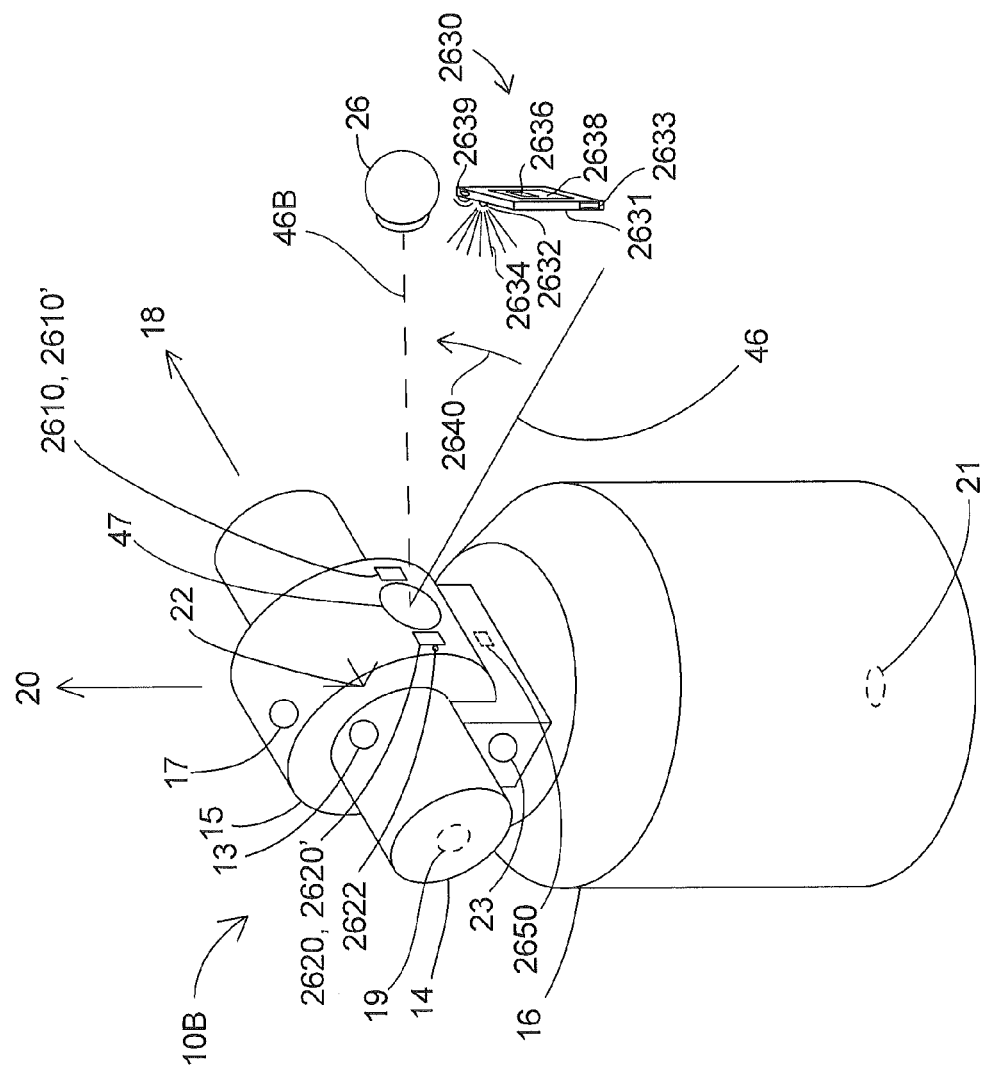
FIG. 26 is a perspective view of a 3D measurement system according to an embodiment.

FIG. 26 shows a laser tracker 10B similar to the laser tracker 10 of FIG. 1 but the cameras 2610, 2620 in FIG. 26 are explicitly described as having different fields of view. In an embodiment, the wide field-of view (FOV) camera 2610 has a wider FOV than the narrow FOV camera 2620. The laser tracker 10B further includes a light source 2622 proximate the entrance aperture of the narrow FOV camera 2620. The light source 2622 is selected to emit light at a wavelength range to which the narrow FOV camera 2620 is sensitive. In an embodiment, wide FOV camera 2610 responds at least to visible wavelengths and narrow FOV camera responds at least to infrared wavelengths. In other embodiments, the cameras 2610, 2620 respond to wavelengths of light in alternative spectral regions.

The term FOV is used here to mean an angular extent viewed by a camera. For example, if the diagonal length of a camera photosensitive array is x, then for a camera lens having a focal length f, the angular FOV may be defined as 2 arctan (x/2 f). Of course, other definitions for FOV may be used, the general notion being that the FOV represents an angular extent of a scene that is captured by a camera photosensitive array. In an embodiment, wide FOV camera 2610 has a FOV in the range of 40 to 90 degrees. In another embodiment, the camera 2610 is a fisheye lens having a wider FOV, for example, between 100 and 180 degrees. In an embodiment, the narrow FOV camera 2620 has a FOV between 0.5 degree and 20 degrees. For the small angles of the narrow FOV camera 2620, an approximate linear transverse dimension that may be viewed by the camera can be found by noting that 1 radian is approximately 60 degrees. Then for a distance R from the tracker to an observation point, the transverse linear dimension L observed by the camera is approximately L=R·FOV/60, where the FOV is given in degrees. For example, if the narrow FOV camera 2620 has a FOV of 4 degrees and the tracker is viewing an object point R=15 meters away, the transverse linear distance seen by the photosensitive array of the narrow FOV camera 2620 is approximately (15 m)(4)/60=1 meter. If the photosensitive array of the narrow FOV camera has 1000 pixels along a linear dimension, then the resolution of the narrow FOV camera is on the order of 1 meter/1000=1 mm. In contrast, for a wide FOV camera having a FOV of 60 degrees, the FOV is more accurately found by the formula 2R·tan (60°/2). For example, if the distance from the tracker to the observation point is 15 meters, the transverse length observed by the camera is (2)(15 m)(tan(60°/2))=17.3 m. If this dimension is imaged by the photosensitive array of the wide FOV camera 2610 over 1000 pixels, then the resolution of the object point is on the order of 17.3 m/1000=17.3 mm.

In an embodiment, a 3D measurement system includes the laser tracker 10B, a retroreflector 26, and a communication device 2630. Although the retroreflector 26 is shown in the form of an SMR, it is understood that the retroreflector may be in any type of retroreflective target—for example, a stand-alone cube-corner retroreflector or cateye retroreflector, or a retroreflector embedded in a six-DOF target. In an embodiment, the communication device 2630 includes an operator-controlled unit 2631 configured to control emission of light 2634 from the light source 2632. The light source 2632 may be a mostly visible light source, for example, a "flashlight" illuminator found in many smart phones or a light on a remote control unit.

In an embodiment, the light source 2632 is activated when an operator presses an actuator 2636, which may be a touch-screen selection icon on a user interface 2638 of a smart device (e.g., communication device 2630). A smart device is an electronic device that operates to some extent interactively and autonomously. In most cases, a smart device may also be connected to other devices through protocols such as Bluetooth, near-field communication (NFC), Wi-Fi (IEEE 802.11 standard), a cellular communications method (for example, 3G or LTE), or any of a variety of other communication protocols. Examples of smart devices include smart mobile phones, smart tablets, smart laptops, and smart wearables.

In an alternative embodiment, the communication device 2630 is a remote control. An operator-controlled unit (e.g., 2631) of the remote control may include a plurality of tactile keys (e.g., actuator 2636) activated when pressed by the user. These keys serve as actuators 2636 of the operator-controlled unit 2631. The communication device 2630 further includes a light source 2632 activated by pressing one of the tactile keys. In an embodiment, the light source 2632 may be a white-light LED or any other type of light source that illuminates in response to activation of an actuator 2636 by an operator.

Electrical components, which may include a processor, in the operator-controlled unit 2631 send a signal to the light source 2632 in response to activation of the actuator 2636 by the operator. The light source 2632 illuminates in response to activation of the actuator 2636. The emitted light 2634 may be emitted in a variety of patterns, according to different embodiments, for example: (1) for as long as the operator presses the actuator icon; (2) for a predetermined fixed length of time; (3) in a temporal pattern of light emissions corresponding to a command associated with the selected actuator; or (4) in a pattern of illumination until light from the light source 2622 on the tracker 10B is reflected by the retroreflector 26 and received by the narrow FOV camera 2620.

In an embodiment, the communication device 2630, whether a smart device or a remote control, is further configured to communicate with the laser tracker 10B with wireless signals. In an embodiment, the communication device 2630 further includes a battery 2633, which may be a rechargeable battery.

A tracker lock-in command is a command that initiates steering a beam of light 46 from a light source (depicted generally by reference numeral 47) within the tracker 10B. The newly directed light 46B strikes the retroreflector 26. The light striking the retroreflector 26 is reflected back into the tracker 10B, a portion of the reflected light traveling to a position detector 13 within the tracker 10B and another portion traveling to a distance meter 17. The position detector 13 provides a signal indicative of a location at which the reflected light strikes a surface area of the position detector 13. After the signal is received by the position detector 13, the tracker control system 23 causes the beam of light 46B to remain locked onto the retroreflector 26, even as the retroreflector 26 is moved. The action of the tracker motors to keep the beam of light 46B on the retroreflector 26 is based at least in part on signals provided by the position detector 13.

In an embodiment, pressing by an operator of a designated actuator 2636 causes light 2634 to be emitted from the communication device 2630, which in turn causes a processor (e.g., processing system 800 depicted in FIG. 17) to carry out via executable instructions executed by the processor 800 a series of steps by which to determine whether a lock-in command has been emitted and if so to steer the beam of light 46 from the tracker 10B to be steered to the retroreflector 26 and to lock onto the retroreflector as represented by the beam of light 46B.

The light 2634 emitted from the light source 2632 by the communication device 2630 may provide a bright signal to the wide FOV camera 2610. The high level of light that may be provided can readily be seen by observing light 2634 from a typical flashlight function of a smart phone (e.g., communication device 2630). In most cases, such a light is brighter than surrounding objects, making it easy to locate with the wide FOV camera 2610. In some cases, it may be advantageous to turn the light source 2632 on and off at a fixed repetition frequency, thereby enabling the tracker 10B to locate the light source 2632 from the flashes. In some cases, the wide FOV camera 2610 may be provided with an optical bandpass filter to more clearly show the flashing light. In other cases, the wide FOV camera 2610 may be a color camera having additional functionality besides that of initiating the lock-in sequence, as discussed further hereinbelow. In this case, an option is to select the illumination from subpixels of a particular color. For example, if the light source 2632 emits red wavelengths, then the signal levels of the red subpixels may be evaluated to determine the location of the strongest red emissions.

A processor (e.g., processing system 800) within the tracker 10B determines that a lock-in command has been given based at least in part on a digital image formed on the photosensitive array of the wide FOV camera 2610 (also herein referred to as the first camera), which is indicative of the light source 2632 having been illuminated. As indicated in FIG. 17, the processor 800 may be in an external computer, an interface box attached to the tracker, or in one or more internal processors within the tracker, which may include microprocessors, digital signal processors (DSPs), field programmable gate arrays (FPGAs), or any other type of computing device. The computing device will in general have a certain amount of associated memory to use.

In an embodiment, the processor 800 causes the light source 2622 on the tracker 10B to be illuminated in response to a lock-in signal having been given. The light from the light source 2622 illuminates the retroreflector 26 and is reflected back toward the narrow FOV camera 2620 (also herein referred to as the second camera). If the reflected light is within the FOV of the narrow FOV camera 2620, the processor 800 directs the motors of the tracker 10B to drive the beam of light 46 to intercept the retroreflector 26 as represented by the beam of light 46B.

If the reflected light from the light source 2622 on the tracker 10B is not within the FOV of the narrow FOV camera 2620, the processor 800 uses the information provided by the digital image of the wide FOV camera 2610 in response to the light 2634 from the communication device 2630 to steer the beam of light 46 from the tracker to the retroreflector as a redirected beam of light 46B while at the same time continuing to illuminate the light source 2622 on the tracker 10B. When the reflected light from the light source 2622 on the tracker 10B is seen by the narrow FOV camera 2620, the processor 800 causes steering to be based mainly or entirely on the digital image picked up on the second narrow FOV camera 2620.

In an embodiment, the light 2634 from the light source 2632 of the communication device 2630 continues to be illuminated in some sort of pattern until the reflected light from the light source 2622 on the tracker 10B is picked up by the narrow FOV camera 2620. By continuing to illuminate the light source 2632, for example in a flashing pattern, the processor 800 may be able to more accurately direct the beam of light 46 toward the retroreflector 26 as represented by the beam of light 46B. In an embodiment, the tracker 10B sends a wireless signal from a wireless transceiver 2650 of the laser tracker 10B to a wireless transceiver 2639 of the communication device 2630, the wireless signal indicating whether the narrow FOV camera 2620 has picked up reflected light from light source 2622 on the tracker 10B. In an embodiment the wireless signal is an electromagnetic signal provided at radio frequency (RF), microwave, or millimeter wave regions of the electromagnetic spectrum.

When the beam of light 46B falls on the retroreflector 26, the reflected light from the light source 2622 on the tracker 10B falls somewhere along a line on the photosensitive array, the position on the line determined by the distance from the tracker 10B to the retroreflector 26. This line on the photosensitive array may be determined at the factory and included in memory of the processor 800 to speed up acquisition of the retroreflector 26 as the beam 46 is steered.

In some cases, an operator may want to carry the retroreflector 26 to a location, without returning to the tracker 10B or to a computer console (e.g., computer 80 depicted in FIG. 2), and have the beam of light 46 be steered to the retroreflector 26. In an embodiment, the operator presses the actuator 2636, which causes the light source 2632 to emit the light 2634, leading to the processor-directed sequence of events described above. This way of directing the beam of light 46 to the retroreflector 26 is particularly useful when the operator must carry the SMR 26 to a difficult location, for example, up a ladder.

In some cases, an operator may have the beam of light 46 locked onto an SMR 26 in one location with the SMR 26 being held by a magnetic nest. The operator may want to carry a second SMR 26 to a second location, perhaps up a ladder, and have the tracker beam of light 46 find and lock onto the second SMR 26. In an embodiment, the communication device 2630 has actuators 2636 corresponding to two different types of lock-in commands. In a first lock-in command, the beam of light 46B locks onto the SMR 26 closest the light source 2632. In a second lock-in command, the beam of light 46B locks onto the SMR 26 closest to its nearest position as long as the nearest position is within the FOV of the narrow FOV camera 2620.

In an embodiment, the communication device 2630 includes additional actuators 2636 corresponding to additional tracker commands. In an embodiment, one of the tracker commands is a measure command that causes the tracker to determine 3D coordinates of the retroreflector 26 based at least in part on a distance and two angles measured by the tracker 10B. The distance may be measured by a distance meter 17 and first and second angles measured by first 21 and second 19 angular encoders, respectively.

In an embodiment, the processor 800 is configured to show an image from the wide FOV camera 2610 on a display, which may be a display (e.g., user interface 2638) on a smart device (e.g., communication device 2630) held by an operator or on a computer monitor, for example. By selecting a position on the display, for example, with a mouse or other selection device, the operator may initiate a click-to-drive command in which the tracker 10B is directed to go to the indicated position. The click-to-drive command may be set to automatically further lock into the retroreflector 26 nearest the click-to-drive position (if a retroreflector is present).

In an embodiment, the laser tracker 10B may send a wireless message from its wireless transceiver 2650 to the wireless transceiver 2639 of the communication device 2630 when the beam 46 is no longer locked onto the retroreflector 26. The communication device 2630 may respond by giving the operator a warning message, for example, a flashing light or a warning beep. The operator may in turn respond to the warning message by pressing the actuator 2636 corresponding to the lock-in command. Alternatively, the operator may set the communication device 2630 to automatically activate the lock-in sequence starting with flashing the light 2632 when it receives the wireless "lock-is-lost" message from the laser tracker 10B. In another embodiment, in response to receiving the wireless lock-is-lost message from the laser tracker 10B, the wireless device (e.g., communication device 2630) may be set to return a "lock-in-narrow" command to the tracker 10B. This command will not cause the processor 800 to activate the light source 2632 to emit the light 2634 but will instead determine whether the narrow FOV camera 2620 is able to see the reflected light from the light source 2622 on the tracker 10B. If the narrow FOV camera 2620 is able to see the reflected light, the processor 800 causes the beam of light 46 to be steered to lock onto the retroreflector 26 as represented by the beam of light 46B.

Figure 27:
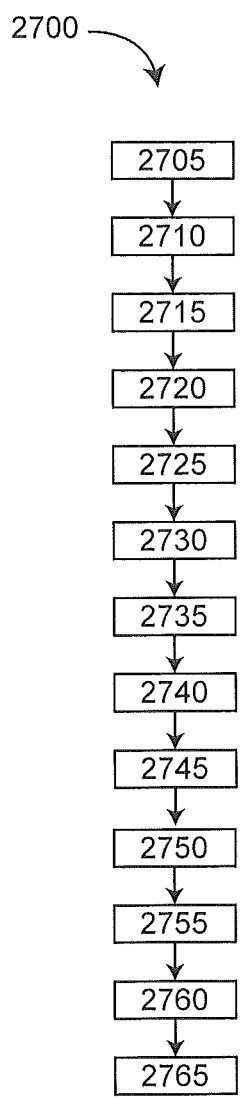
FIG. 27 shows elements of a method for locking onto a retroreflector according to an embodiment.

FIG. 27 shows elements of a method 2700 for locking onto a retroreflector 26 with a laser tracker 10B according to an embodiment. Element 2705 includes providing a communication device 2630, a retroreflector 26, and a laser tracker 10B. The communication device 2630 has a first light source 2632 and an operator-controlled unit 2631 that controls emission of a first light 2634 from the first light source 2632. The retroreflector 26 is separate from the communication device 2630. The laser tracker 10B includes a structure (e.g., azimuth base 16), a distance meter 17, a first angular encoder 21, a second angular encoder 19, a first camera (wide FOV camera) 2610, a second camera (narrow FOV camera) 2620, a second light source 2622, a position detector 13, a processor 800, and a third light source 47. The structure 16 rotates about a first axis 20 and a second axis 18. The second camera 2620, which is proximate the second light source 2622, has a narrower field-of-view than the first camera 2610. The first and the second cameras 2610, 2620 are affixed to an external portion of the structure 16. The position detector is internal to the tracker 10B.

The element 2710 includes emitting the first light 2634 from the communication device 2630. The element 2715 includes capturing the first light 2634 with the first camera (wide FOV camera) 2610 to produce a first digital image (represented generally with reference to numeral 2610'). The element 2720 includes determining by the processor 800, based at least in part on the first digital image 2610', that a lock-in command has been given and in response activating the second light source 2622 (proximate the narrow FOV camera 2620) to produce second light.

The element 2725 includes reflecting from the retroreflector 26 a portion of the second light as second reflected light. The element 2730 includes capturing the second reflected light with the second camera 2620 to produce a second digital image (represented generally with reference to numeral 2620').

The element 2735 includes launching a third light beam 46 from the third light source 47, steering the structure 16 to direct the third light beam 46 to the retroreflector 26, the steering based at least in part on one of the second digital image and a reading of the position detector 13.

The element 2740 includes reflecting a portion of the third light beam 47 as a third reflected light. The element 2745 includes capturing a first part of the third reflected light with the position detector 13. The element 2750 includes capturing a second part of the third reflected light with the distance meter 17.

The element 2755 includes determining with the processor a first distance to the retroreflector 26 based at least in part on the second part of the third reflected light. The step 2760 includes measuring with the first angular encoder 21 a first angle of rotation about the first axis 20. The step 2765 includes measuring with the second angular encoder 19 a second angle of rotation about the second axis 18. The step 2760 includes determining with the processor 800 three-dimensional (3D) coordinates of the retroreflector 26 based at least in part on the first distance, the first angle of rotation, and the second angle of rotation. The step 2765 includes storing the 3D coordinates.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A three-dimensional (3D) coordinate measurement system, comprising:
   a communication device that includes a first light source and an operator-controlled unit, the operator-controlled unit configured to control emission from the first light source;
   a retroreflector separate from the communication device;
   a laser tracker including:
      a structure rotatable about a first axis and a second axis;
      a first camera;
      a second light source;
      a second camera proximate the second light source, the second camera having a narrower field-of-view than the first camera; and
   a processor responsive to executable instructions which when executed by the processor is operable to:
      cause the first camera to capture a first light emitted by the first light source in a first digital image;
      determine that a retroreflector lock-in command has been given based at least in part on the first digital image;
      respond to the retroreflector lock-in command having been given by:
         activating the second light source to produce a second light reflected by the retroreflector as a second reflected light;
         capturing the second reflected light with the second camera to produce a second digital image; and
         steering the structure based at least in part on the second digital image.

2. The system of claim 1 wherein the processor is further operable to respond to the retroreflector lock-in command having been given by steering the structure further based on the first digital image.

3. The system of claim 1 wherein:
   the first light source is configured to emit visible light; and
   the first camera is responsive to visible wavelengths of the first light source.

4. The system of claim 3 where the first camera is a color camera.

5. The system of claim 3 wherein:
   the 3D coordinate measurement system further includes a display, the display configured to show image data obtained from the first camera; and
   the processor is further configured to steer the structure to a user-selected position on the display.

6. The system of claim 1 wherein:
   the second light source is configured to emit infrared light; and
   the second camera is responsive to infrared wavelengths of the second light source.

7. The system of claim 1 wherein the laser tracker further includes:
   a third light source that emits a third beam of light;
   a distance meter; and
   a position detector internal to the structure, the position detector having a surface area.

8. The system of claim 7 wherein the processor is further operable to respond to the retroreflector lock-in command having been given by obtaining from the position detector a position detector reading that indicates whether a first portion of the third light reflected by the retroreflector as a third reflected light is received by the position detector and, if so, a position on the surface area at which the first portion of the third reflected light is received.

9. The system of claim 8 wherein the processor is further operable to respond to the retroreflector lock-in command having been given by steering the structure further based on the position detector reading.

10. The system of claim 9 wherein the processor is further operable to respond to the retroreflector lock-in command having been given by:
   capturing a plurality of third digital images with the second camera and taking a corresponding plurality of third position detector readings; and
   steering the structure to direct the third light beam to the retroreflector further based on the plurality of the third digital images and the plurality of third position detector readings.

11. The system of claim 8 wherein the laser tracker further includes a first angular encoder and a second angular encoder.

12. The system of claim 11 wherein the processor is further operable to:
   receive by the distance meter a second portion of the third reflected light;
   determine a first distance based at least in part on the second portion of the third reflected light;
   measure with the first angular encoder a first angle of rotation about the first axis;
   measure with the second angular encoder a second angle of rotation about the second axis; and
   determine 3D coordinates of the retroreflector based at least in part on the first distance, the first angle of rotation, and the second angle of rotation.

13. The system of claim 1 wherein the processor is further operable to:
cause the first camera to capture a plurality of fourth digital images; and
determine that the lock-in command has been given further based on the plurality of fourth digital images.

14. The system of claim 1 wherein the communication device further includes a battery.

15. The system of claim 14 wherein the battery is rechargeable.

16. The system of claim 1 wherein the operator-controlled unit includes a first actuator that when activated causes the first light source to illuminate.

17. The system of claim 13 wherein the first light source is illuminated in a first temporal pattern.

18. The system of claim 17 wherein the processor determines that the lock-in command has been given is further based on a correspondence between the first temporal pattern and the lock-in command.

19. The system of claim 16 wherein the actuator is selected from the group consisting of a button and a selection from a touch screen display.

20. The system of claim 16 wherein the communication device further includes a second actuator configured to send a wireless signal to the tracker when the second actuator is activated, the wireless signal indicative of a second command.

21. The system of claim 20 wherein the communication device is a remote control unit.

22. The system of claim 20 wherein the communication device is a smart device configured for communication with the laser tracker.

23. The system of claim 22 wherein the smart device is selected from the group consisting of a tablet, a mobile phone, a laptop computer, and a wearable device.

24. The system of claim 22 wherein the smart device is configured to provide a user interface, the user interface including a display configured to provide a selection of tracker commands, the selection of tracker commands including the retroreflector lock-in command and a measure command.

25. The system of claim 24 wherein the smart device is configured to download software from an Internet.

26. The system of claim 8 wherein the processor is further configured to send a warning indication to the communication device in response to obtaining a position detector reading indicating that the first portion of the third reflected light has not been received.

27. The system of claim 26 wherein the operator-controlled unit is controlled by a control selected from the group consisting of a voice command, a button push, and a menu selection on a touch screen display.

28. A method for locking on a retroreflector with a laser tracker, the method comprising:
providing a communication device, the retroreflector, and the laser tracker,
the communication device including a first light source and an operator-controlled unit, the operator-controlled unit configured to control emission of a first light from the first light source,
the retroreflector separate from the communication device,
the laser tracker including a structure, a distance meter, a first angular encoder, a second angular encoder, a first camera, a second camera, a second light source, a position detector, a processor, and third light source, the structure rotatable about a first axis and a second axis, the second camera proximate the second light source, the second camera having a narrower field-of-view than the first camera, the first camera and the second camera affixed to an external portion of the structure, the position detector internal to the tracker;
emitting the first light from the communication device;
capturing the first light with the first camera to produce a first digital image;
determining by the processor, based at least in part on the first digital image, that a lock-in command has been given and in response activating the second light source to produce second light;
reflecting from the retroreflector a portion of the second light as second reflected light;
capturing the second reflected light with the second camera to produce a second digital image;
launching a third light beam from the third light source;
steering the structure to direct the third light beam to the retroreflector, the steering based at least in part on one of the second digital image and a reading of the position detector;
reflecting a portion of the third light beam as a third reflected light;
capturing a first part of the third reflected light with the position detector;
capturing a second part of the third reflected light with the distance meter;
determining with the processor a first distance to the retroreflector based at least in part on the second part of the third reflected light;
measuring with the first angular encoder a first angle of rotation about the first axis;
measuring with the second angular encoder a second angle of rotation about the second axis;
determining with the processor three-dimensional (3D) coordinates of the retroreflector based at least in part on the first distance, the first angle of rotation, and the second angle of rotation; and
storing the 3D coordinates.

29. The method of claim 28 wherein:
the step of capturing the second reflected light with the second camera to produce a second digital image further includes capturing a plurality of third digital images and taking a corresponding plurality of third position detector readings; and
the step of steering the structure to direct the third light beam to the retroreflector is further based on the plurality of third digital images and the plurality of third position detector readings.

30. The method of claim 29 wherein:
the step of capturing the first light with the first camera to produce a first digital image further includes capturing a plurality of fourth digital images; and
the step of determining by the processor that the lock-in command has been given, the determining further based on the plurality of fourth digital images.

* * * * *